United States Patent [19]

Katayama

[11] Patent Number: 5,570,333
[45] Date of Patent: Oct. 29, 1996

[54] HEAD DEVICE FOR MAGNETO-OPTICAL DISK

[75] Inventor: Ryuichi Katayama, Tokyo, Japan

[73] Assignee: NEC Corporation, Tokyo, Japan

[21] Appl. No.: 265,753

[22] Filed: Jun. 27, 1994

[30] Foreign Application Priority Data

Jun. 25, 1993 [JP] Japan .................................. 5-154038
Jan. 17, 1994 [JP] Japan .................................. 6-002904

[51] Int. Cl.$^6$ ...................................................... G11B 7/00
[52] U.S. Cl. ........................ 369/110; 369/109; 369/44.12
[58] Field of Search ............................... 369/44.12, 44.15, 369/44.14, 44.23, 44.24, 112, 110, 109

[56] References Cited

U.S. PATENT DOCUMENTS

| | | | |
|---|---|---|---|
| 4,779,250 | 10/1988 | Kogure et al. | 369/13 |
| 4,989,189 | 1/1991 | Sander et al. | 369/13 |
| 5,128,914 | 7/1992 | Kurata et al. | 369/44.38 |
| 5,180,909 | 1/1993 | Ohyama et al. | 369/44.12 |
| 5,231,620 | 7/1993 | Ohuchida | 369/44.12 |
| 5,272,329 | 12/1993 | Nagahama et al. | 369/44.12 |
| 5,416,765 | 5/1995 | Aikoh et al. | 369/44.23 |
| 5,436,876 | 7/1995 | Yokoyama et al. | 369/112 |

FOREIGN PATENT DOCUMENTS 232633  8/1992  Japan .

*Primary Examiner*—Nabil Z. Hindi
*Attorney, Agent, or Firm*—Sughrue, Mion, Zinn, Macpeak & Seas

[57] ABSTRACT

A magneto-optical head device includes a semiconductor laser, an objective lens system, a diffractive element, photodetectors, and an analyzer. The diffractive element has diffraction efficiency dependent on a polarization direction of incident light. The photodetectors receive the light reflected from a magneto-optical disk and diffracted at the diffractive element. The analyzer splits at least a part of the diffracted light from the diffractive element into two polarized components orthogonal to each other. The diffractive element has characteristics with which the polarized component in a predetermined direction in the incident light is partially diffracted and the polarized component orthogonal thereto is substantially totally diffracted. The diffractive element is disposed such that the polarization direction of the light emitted from the semiconductor laser coincides with the predetermined direction, and the analyzer is disposed such that the two polarized components split by the analyzer make an angle of about 45° with respect to the polarization direction of the light emitted from the semiconductor laser. The amounts of the main polarization component beams that reach the two photodetectors can be made substantially equal with each other and the common-mode noise elimination ratio during the differential detection operation can be raised. Also, the ratio of the magneto-optical signal component that reaches the photodetectors used for magneto-optical signal detection can be raised.

7 Claims, 17 Drawing Sheets

HEAD DEVICE FOR MAGNETO-OPTICAL DISK

BACKGROUND OF THE INVENTION (1) Field of the Invention

The present invention relates to a magneto-optical head device, and more particularly to a magneto-optical head device for recording, reproducing and erasing data on a magneto-optical disk.

(2) Description of the Related Art

In recent years, for purposes of size and cost reduction of the magneto-optical head device, research is being made for development of a structure utilizing a diffractive element whose diffraction efficiency is dependent on the direction of polarization of incident light.

An example of a conventional magneto-optical head device using such diffractive element as above is shown in FIG. 1 (description of which is found, for example, in Japanese Kokai Patent Application Publication No. Hei 4-232633). In such conventional magneto-optical head devices, the light emitted from a semiconductor laser 20 is transmitted through a polarizing diffraction grating 15 whose diffraction efficiency is dependent on a polarization direction of incident light and, after being converted to parallel light by a collimator lens 14, is converged on a magneto-optical disk 12 by an objective lens 13. The reflected light from a magneto-optical disk 12 is again converted to parallel light by the objective lens 13 and, after being transmitted through the collimator lens 14, is diffracted by the polarizing diffraction grating 15. The +1st order diffracted light and the −1st order diffracted light from the polarizing diffraction grating 15 are received respectively by photodetectors 18 and 19 equipped with analyzing function. The analyzing-function-equipped photodetectors 18 and 19 are constructed such that analyzers 16 and 17, which transmit only a predetermined polarized light component of the incident light, are bonded respectively on photodetectors 21. The analyzers 16 and 17 are disposed so as to allow the polarization directions of the transmitted light to be orthogonal to each other. Thus, the magneto-optical signal is detected from a difference between the outputs of the analyzing-function-equipped photodetectors 18 and 19. The photodetectors 21 used in the analyzing-function equipped photodetectors 18 and 19 are divided respectively into three light receiving sections 21a–21c and 21d–21f. Appropriate calculation of outputs from the light receiving sections enables detecting a focusing error signal and a tracking error signal.

The polarizing diffraction grating 15 in the conventional magneto-optical head device described above has characteristics wherein the diffraction efficiency is dependent on the polarization directions of the incident light. Specifically, it is designed such that the 1st order diffraction efficiency of the polarized light component (P-polarized light component) parallel to and of the polarized light component (S-polarized light component) perpendicular to the grooves in the grating are respectively 30% and 5%. Generally, where the width of a line portion and that of a space portion of! the diffraction grating are the same and the phase difference is assumed $\alpha$, the transmittivity and the 1st order diffraction efficiency are given respectively by $\cos^2(\alpha/2)$, $(2/\pi)^2\sin^2(\alpha/2)$. From this, the transmittivities of the P-polarized light component and the S-polarized light component in the conventional example may be calculated respectively as 26% and 87.7%.

The polarization direction of the light emitted from the semiconductor laser 20 makes an angle of 45° with respect to the P polarization direction. Therefore, assuming that the polarization direction of the light transmitted through the polarizing diffraction grating 15 and then incident on the magneto-optical disk 12 makes an angle of $\theta$ with respect to the P polarization direction, the angle will be:

$$\theta=\tan^{-1}(0.877/0.26)^{1/2}=61.4°$$

The component (main polarized light component) in the polarization direction in the average of the reflected light from the magneto-optical disk 12 is the same as the incident light, and the magneto-optical signal component due to Kerr effect is orthogonal thereto.

The ratio of the magneto-optical signal component diffracted by the polarizing diffraction grating 15 and then led to the analyzing-function-equipped photodetectors 18 and 19 will be:

$$0.3\times2\times\sin^2\theta+0.05\times2\times\cos^2\theta=0.486$$

The analyzers 16 and 17 transmit only the P-polarized light component and the S-polarized light component, respectively, so that the ratio of the magneto-optical signal component reaching the two photodetectors 21 will be a half, that is, 0.243. In order to obtain a good signal-to-noise ratio during the reproduction operation, it is necessary to raise the ratio of the magneto-optical signal component that reaches the photodetectors used for detecting magneto-optical signals. In the prior art, this ratio is 0.243, which is low, so that there is a deterioration in the signal-to-noise ratio.

On the other hand, assuming that the main polarized light component diffracted by the polarizing diffraction grating 15 and led to the analyzing-function-equipped photodetectors 18 and 19 makes an angle of $\phi$ with respect to the P polarization direction, the angle $\phi$ will be:

$$\begin{aligned}\phi &= \tan^{-1}\{(0.05/0.3)^{1/2}\tan\theta\}\\ &= 36.9°\end{aligned}$$

Since the analyzers 16 and 17 transmit the P-polarized light component and the S-polarized light component respectively, the amounts of the main polarized light component beams which reach the two photodetectors 21 are not the same as each other. In order to obtain a good signal-to-noise ratio during the reproduction operation, it is necessary to equalize the amounts of the main polarized component beams which reach the two photodetectors used for detecting the magneto-optical signals and to raise a common-mode noise elimination ratio in the differential detection process. In the exemplified prior art, such amounts are not equal with each other so that the signal-to-noise ratio is deteriorated.

Thus, although the conventional magneto-optical head device is suited to make the device compact and low cost, there is a problem that no satisfactory signal-to-noise ratio is obtained during the reproduction operation.

SUMMARY OF THE INVENTION

An object of the present invention, therefore, is to provide a magneto-optical head device which is not only compact and low cost but also is capable of achieving a satisfactory signal-to-noise ratio during the reproduction operation.

According to one aspect of the invention, there is provided a magneto-optical head device comprising:

a semiconductor laser;

an objective lens system which converges light emitted from the semiconductor laser on a magneto-optical recording medium;

a diffractive element which is provided between the semiconductor laser and the objective lens system and has diffraction efficiency dependent on a polarization direction of incident light;

a photodetecting means receiving light which is reflected from the magneto-optical recording medium and then diffracted at the diffractive element; and an analyzing means which is provided between the diffractive element and the photodetecting means and which splits at least a part of the diffracted light from the diffractive element into two polarized components orthogonal to each other, the diffractive element having characteristics with which the polarized component in a predetermined direction in the incident light is partially diffracted and the polarized component orthogonal thereto is substantially totally diffracted, and the diffractive element being disposed such that the polarization direction of the light emitted from the semiconductor laser coincides with the predetermined direction, and the analyzing means being disposed such that the two polarized components split thereby assume an angle of about 45° with respect to the polarization direction of the light emitted from the semiconductor laser.

According to another aspect of the invention, there is provided a magneto-optical head device comprising:

a semiconductor laser;

an objective lens system which converges light emitted from the semiconductor laser on a magneto-optical recording medium;

a first diffractive element and a second diffractive element which are sequentially provided between the semiconductor laser and the objective lens system, the first diffractive element having diffraction efficiency not dependent on a polarization direction of incident light and the second diffractive element having diffraction efficiency dependent on the polarization direction of incident light;

a first photodetecting means receiving light which is reflected from the magneto-optical recording medium, transmitted through the second diffractive element, and then diffracted by the first diffractive element;

a second photodetecting means receiving light which is reflected from the magneto-optical recording medium and then diffracted by the second diffractive element; and an analyzing means which is provided between the second diffractive element and the second photodetecting means and which splits the diffracted light from the second diffractive element into two polarized components orthogonal to each other, the second diffractive element having characteristics with which the polarized component in a particular direction in the incident light is partially diffracted and the polarized component orthogonal thereto is substantially totally diffracted and the second diffractive element being disposed such that the polarization direction of the light emitted from the semiconductor laser coincides with the particular direction, and the analyzing means being disposed such that the two polarized components split thereby assume an angle of about 45° with respect to the polarization direction of the light emitted from the semiconductor laser.

The diffractive element in the magneto-optical head device according to the invention is equipped with characteristics wherein the polarized light component parallel to the polarization direction of the light emitted from the semiconductor laser is partially diffracted and the polarized light component orthogonal thereto is substantially completely diffracted. Therefore, the polarization direction of the light which is transmitted through the diffraction grating and then incident on the magneto-optical recording medium is coincident with the polarization direction of the light emitted from the semiconductor laser.

Since the magneto-optical signal component of the reflected light from the magneto-optical recording medium is orthogonal to the polarization direction of the light emitted from the semiconductor laser, its component is substantially completely diffracted by the diffractive element before being led to the photodetectors. Thus, it is possible to raise the ratio of the magneto-optical signal component that reaches the photodetector used for magneto-optical signal detection and to suppress the deterioration of the signal-to-noise ratio during the reproduction operation.

On the other hand, since the main polarization component of the reflected light from the magneto-optical recording medium is parallel to the polarization direction of the light emitted from the semiconductor laser, its component is partially diffracted by the diffractive element and is led to the photodetectors. Each of the analyzers is disposed in such a way that two polarized light components divided thereby make an angle of about 45° with respect to the polarization direction of the light emitted from the semiconductor laser so that the amounts of the two polarized light components divided by the analyzer are substantially equal to each other. Thus, if the two polarized light components are received respectively by the photodetectors and used for magneto-optical signal detection, the amounts of the main polarization component beams that reach the two photodetectors used for magneto-optical signal detection can be made substantially equal to each other and the common-mode noise elimination ratio during the differential detection operation can be raised. This suppresses the deterioration of the signal-to-noise ratio during the reproduction operation.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, embodiments of the invention are explained with reference to the drawings.

Figure 1:
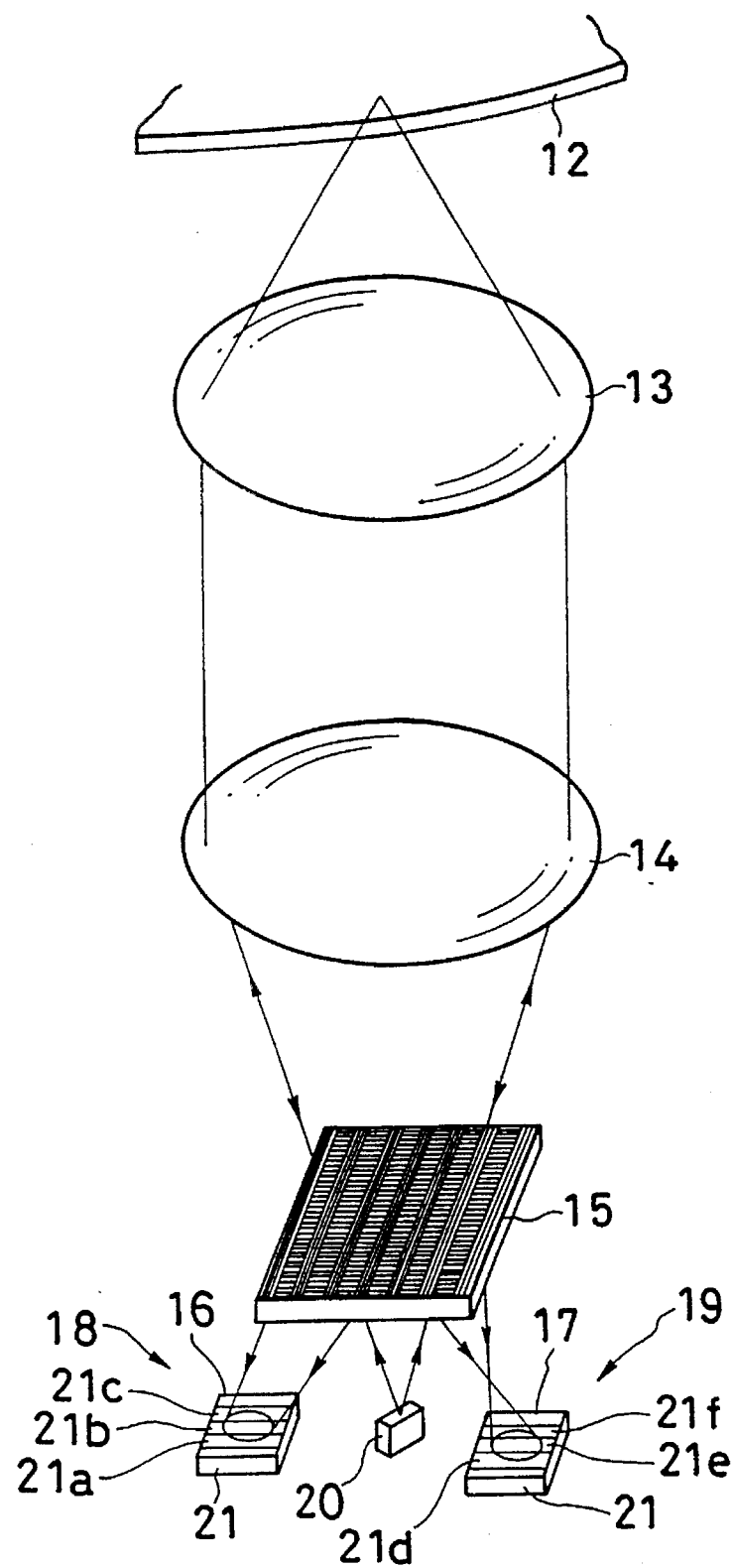
FIG. 1 is a diagram showing an arrangement of a conventional magneto-optical head assembly.
Figure 2:
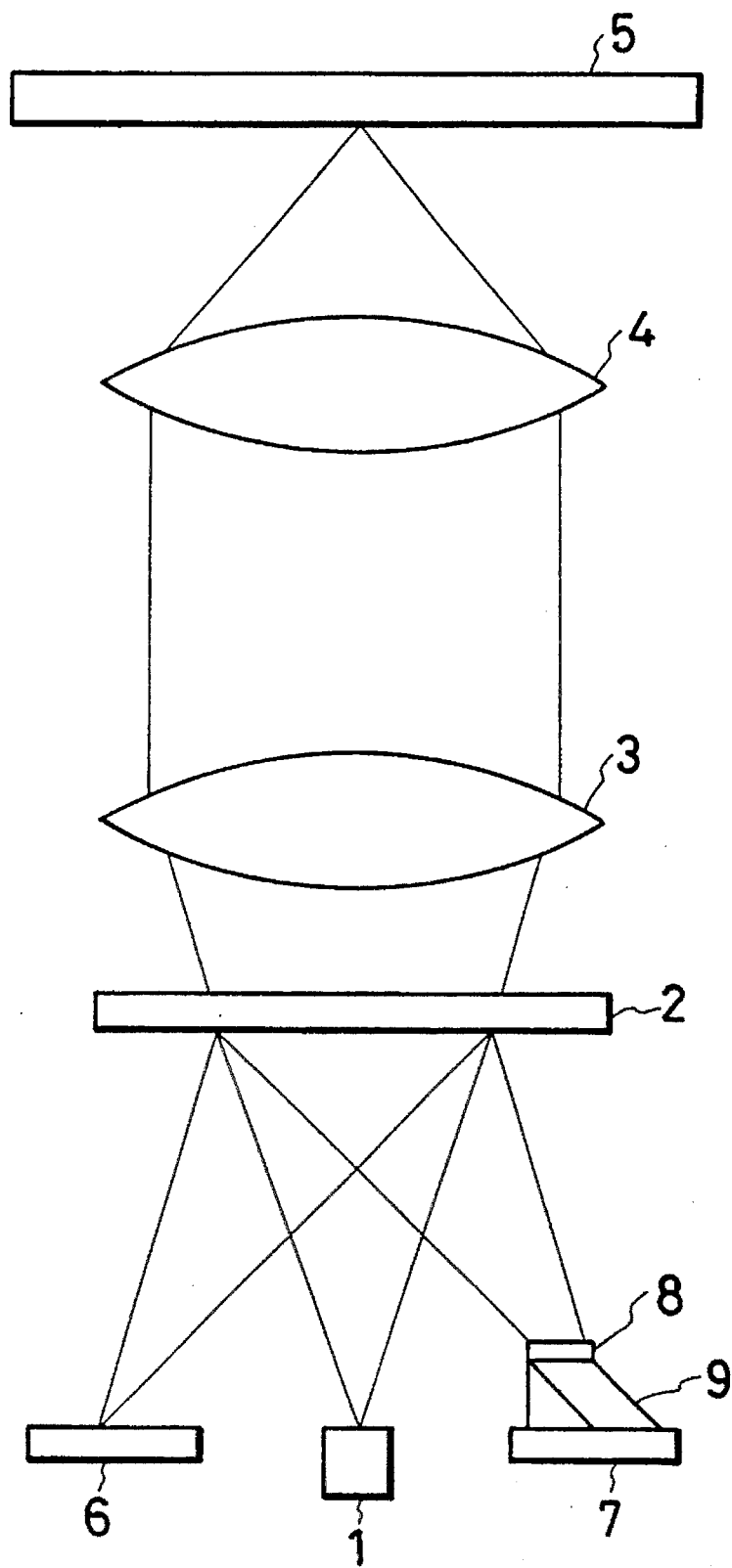
FIG. 2 is a diagram showing an arrangement of a magneto-optical head assembly of a first embodiment according to the invention.

FIG. 2 shows a configuration of a magneto-optical head device of a first embodiment according to the invention. The light emitted from a semiconductor laser 1 is transmitted through a polarizing holographic optical element 2 in which the diffraction efficiency is dependent on the polarization direction of the incident light and, after being converted to parallel beams by the collimator lens 3, is converged on a magneto-optical disk 5 by an objective lens 4. The reflected light from the magneto-optical disk 5 is converted again to parallel beams by the objective lens 4 and, after being transmitted through the collimator lens 3, is diffracted by the polarizing holographic optical element 2. The +1st order diffracted light from the polarizing holographic optical element 2 is received by a photodetector 6. On the other hand, the −1st order diffracted light from the polarizing holographic optical element 2 is transmitted through a half-wave plate 8 and, after its polarization direction is rotated by 45°, is divided by a polarizing beam splitter 9 into two polarized light components which are orthogonal to each other and which are detected by a photodetector 7.

Figure 3:
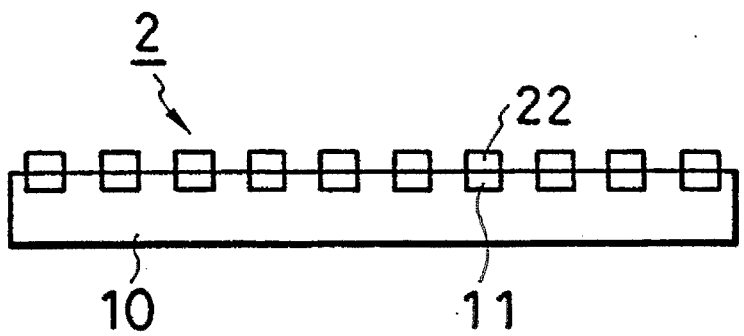
FIG. 3 is a diagrammatic sectional view of a polarizing holographic optical element used in the assembly according to the invention.

FIG. 3 shows in a diagrammatic sectional view the polarizing holographic optical element 2. This element is constituted by a two layer diffraction grating with a proton exchanged region 11 and a dielectric film 22 formed on a substrate 10 of lithium niobate having birefringence. The dielectric film 22 employs, for example, $Nb_2O_5$. Where the refractive index differences between the proton exchanged region 11 and the lithium niobate substrate 10 with respect to the polarized light component perpendicular to the optic axis (ordinary light component) and the polarized light component parallel to the optic axis (extraordinary light component) are respectively assumed to be $\Delta n_o$ and $\Delta n_e$, the refractive index of the dielectric film 22 to be n, the depth of the proton exchanged region 11 and the thickness of the dielectric film 22 to be respectively Tp and Td, the phase differences between the line portion and space portion of the grating with respect to the ordinary light component and the extraordinary light component to be respectively $\alpha_o$ and $\alpha_e$, and the wavelength of the incident light to be $\lambda$, the following derives:

$$2\pi/\lambda \times \{(n-1)Td + \Delta n_o Tp\} = \alpha_o$$

$$2\pi/\lambda \times \{(n-1)Td + \Delta n_e Tp\} = \alpha_e$$

In actuality, $\Delta n_o = -0.04$, $\Delta n_e = 0.12$ and $n = 2.2$ (where the dielectric film 22 is $Nb_2O_5$). Thus, if, for example, $\lambda = 0.83$ μm, Tp=1.73 μm and Td=0.173 μm, the phase differences will be $\alpha_o = \pi/3$ and $\alpha_e = \pi$. If the widths of the line portion and the space portion of the grating are equal with each other, the transmittivities of the ordinary light component and the extraordinary light component will respectively be:

$$\cos^2(\alpha_o/2) = 0.75$$

$$\cos^2(\alpha_e/2) = 0$$

Also, the 1st order diffraction efficiencies with respect to the ordinary light component and the extraordinary light component will respectively be:

$$(2/\pi)^2 \sin^2(\alpha_o/2) = 0.101$$

$$(2/\pi)^2 \sin^2(\alpha_e/2) = 0.405$$

It is noted from this that the ordinary light component is partially diffracted and the extraordinary light component is substantially completely diffracted.

When the direction of the optic axis of the lithium niobate substrate 10 is set perpendicular to the polarization direction of the light emitted from the semiconductor laser 1, the emitted light therefrom is incident on the polarizing holographic optical element 2 as ordinary light so that 75% of it is transmitted. On the other hand, since the main polarization component is incident on the polarizing holographic optical element 2 as ordinary light, the reflected light beam from the magneto-optical disk 5 is diffracted by 10.1% as +1st order diffracted light and 10.1% as −1st order diffracted light. Also, since the magneto-optical signal component is incident on the polarizing holographic optical element 2 as extraordinary light, the reflected light beam is diffracted by 40.5% as +1st order diffracted light and 40.5% as −1st order diffracted light.

Figure 4:
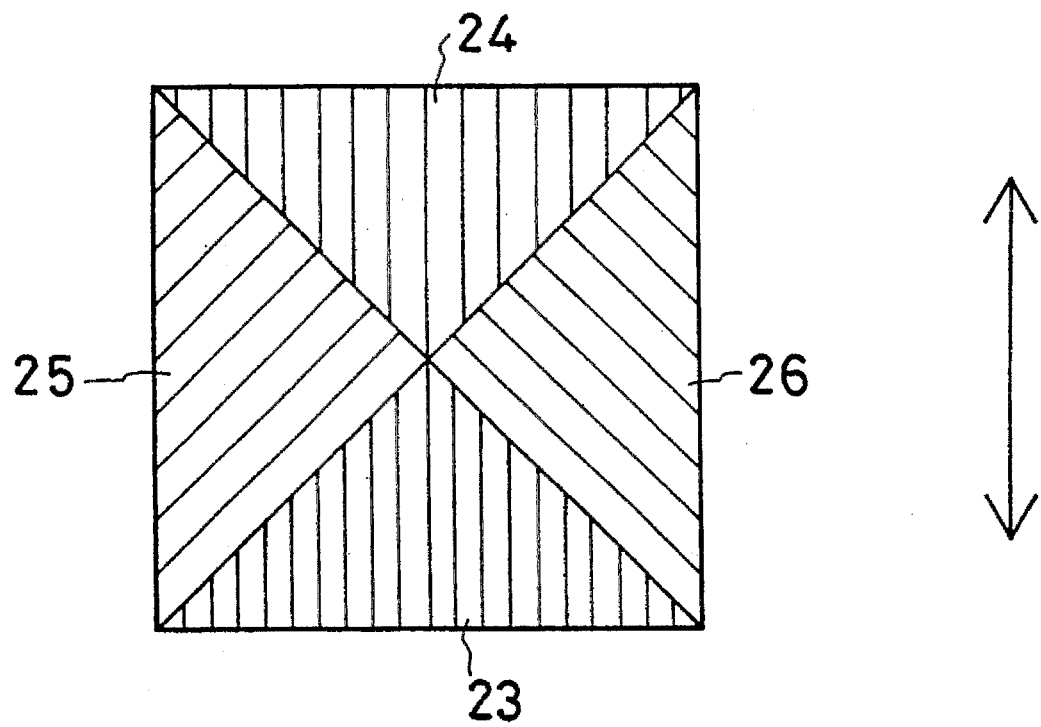
FIG. 4 is a diagram showing an arrangement of the polarizing holographic optical element used in the assembly of the first embodiment according to the invention.

FIG. 4 shows a configuration of the polarizing holographic optical element 2. This element 2 is divided into four regions 23 through 26 whose grating pitches or grating directions are different. The direction of the optic axis of the lithium niobate substrate 10 is shown by arrows in the figure.

Figure 5:
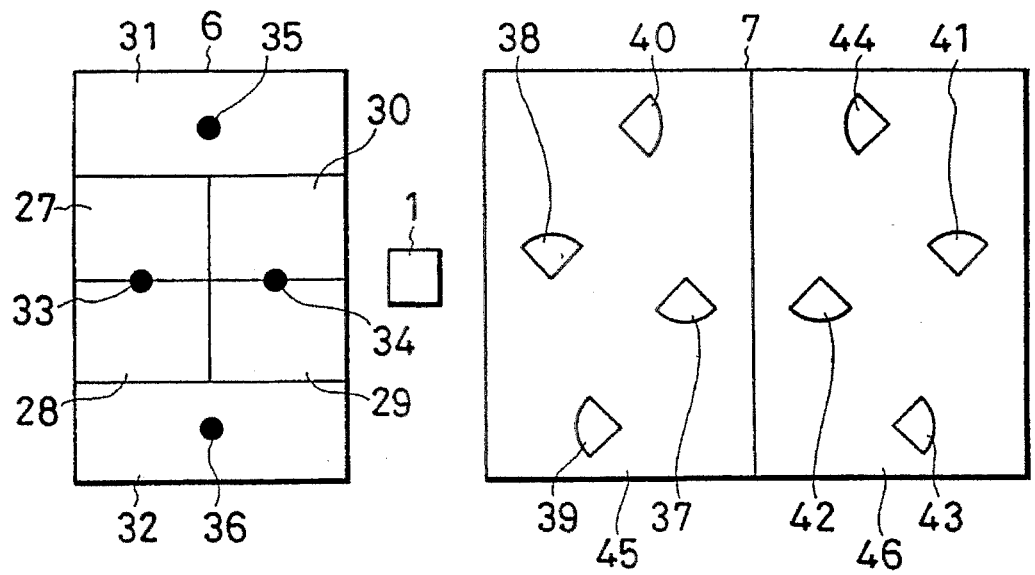
FIG. 5 is a diagram showing an arrangement of photodetectors used in the assembly of the first embodiment according to the invention, and positions of light spots on such photodetectors.

FIG. 5 shows a configuration of the photodetectors 6 and 7 and positions of light spots on the photodetectors 6 and 7. The photodetector 6 is divided into six light receiving sections 27–32. Also, the photodetector 7 is divided into two light receiving sections 45 and 46.

The +1st order diffracted beams of light from the regions 23–26 of the polarizing holographic optical element 2 respectively form light spots 33–36 on the photodetector 6. The light spot 33 is positioned on the dividing line of the receiving sections 27 and 28, the light spot 24 on the dividing line of the receiving sections 29 and 30, the light spot 35 within the receiving section 31, and the light spot 36 within the receiving section 32. If the outputs from the light receiving sections 27 through 32 are expressed respectively by V(27) through V(32), the focusing error Signals may be obtained from {V(27)+V(29)}−{V(28)+V(30)} based on the Foucault theory. Also, the tracking error signals may be obtained from V(31)−V(32) based on a push-pull theory.

Figure 12A:
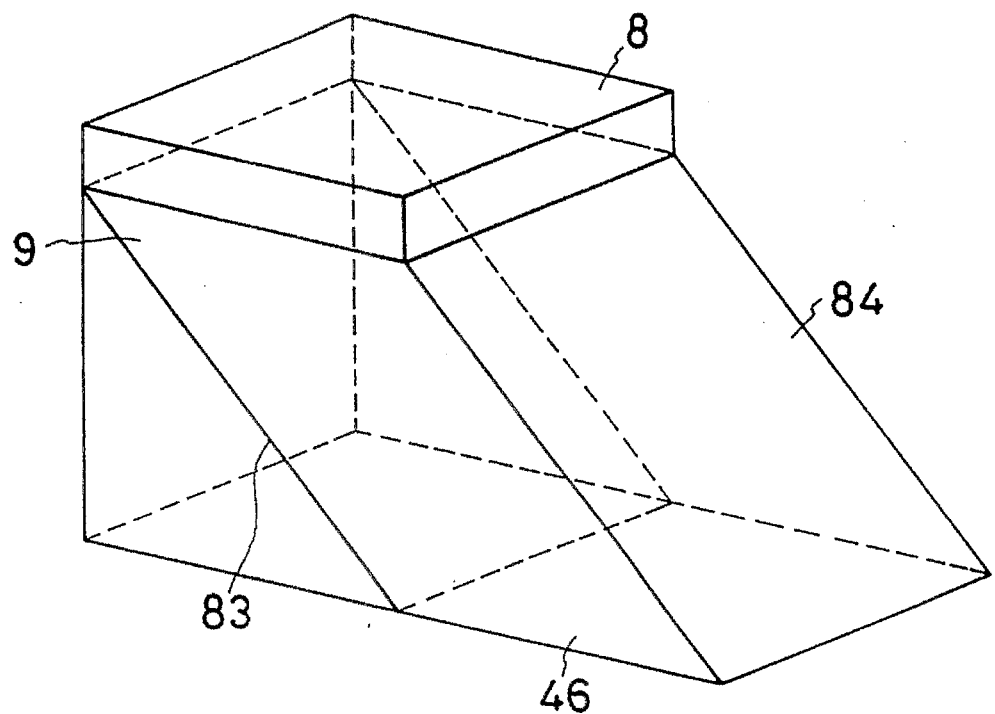
FIGS. 12A and 12B are perspective views of polarizing beam splitters used respectively in the first embodiment and the second embodiment according to the invention.

FIG. 12A shows in an enlarged view of the half-wave plate 8 and the polarizing beam splitter 9. The −1st order diffracted light from the regions 23 through 26 of the polarizing holographic optical element 2 is transmitted through the half-wave plate 8 and, after its polarization direction is rotated 45°, is incident on the polarizing beam splitter 9. The S-polarized light component reflected at a cemented surface 83 of the polarizing beam splitter 9 is reflected at a total internal reflection surface 84 and then is received by the light receiving section 46. The diffracted beams of light from the regions 23 through 26 respectively correspond to the light spots 41 through 44. The P-polarized light component transmitted through the cemented surface 83 of the polarizing beam splitter 9 is received by the light receiving section 45. The diffracted beams of light from the regions 23 through 26 respectively correspond to the light spots 37 through 40. If the outputs from the light receiving sections 45 and 46 are expressed respectively by V(45) and V(46), the magneto-optical signal may be obtained from V(45)−V(46) based on the differential detection process theory.

Of the magneto-optical signal component of the reflected light from the magneto-optical disk 5, the ratio of the light that reaches the light receiving sections 45 and 46 for the magneto-optical signal detection equals the diffraction efficiency of the 1st order light diffracted by the polarizing holographic optical element 2 with respect to the extraordinary light component, namely, 0.405. This value in the prior art is 0.243 so that, in this embodiment according to the invention, the ratio of the magneto-optical signal component is raised 1.67 times compared with that in the prior art. Also, the polarization direction of the main polarization component of the reflected light from the magneto-optical disk 5, after being rotated by 45° by the half-wave plate 8, assumes an angle of 45° with respect to the P-polarized and S-polarized light components split by the polarizing beam splitter 9. Therefore, in this embodiment according to the invention, the amounts of the two main polarization components which are received by the light receiving sections 45 and 46 of the photodetector 7 and used for the magneto-optical signal detection become equal to each other, thereby raising the common-mode noise elimination ratio in the differential detection process.

Figure 6:
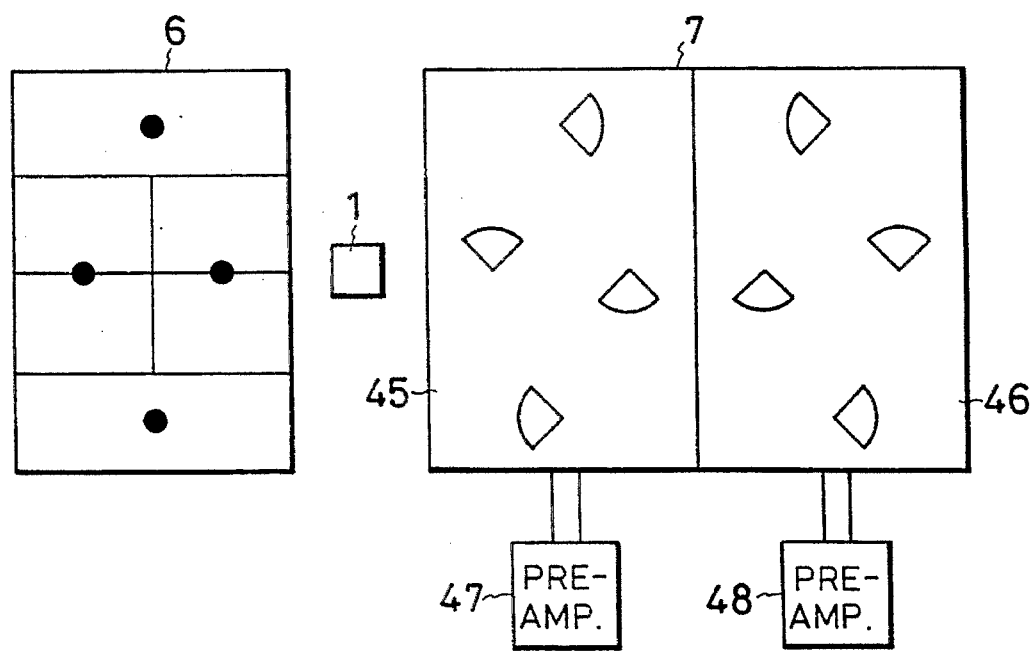
FIG. 6 is a diagram showing connections of preamplifiers used in the assembly of the first embodiment according to the invention.

FIG. 6 shows an arrangement wherein the outputs from the light receiving sections 45 and 46 of the photodetector 7 are led to preamplifiers 47 and 48. By providing the preamplifiers 47 and 48 in proximity to the photodetector 7, it is possible to suppress the mixing of noise from the exterior of the interconnecting wiring extending from the photodetector to the preamplifiers, thereby further raising the signal-to-noise ratio during the reproduction operation. The photodetector 7 and the preamplifiers 47 and 48 can be monolithically integrated in the same silicon substrate.

Figure 7:
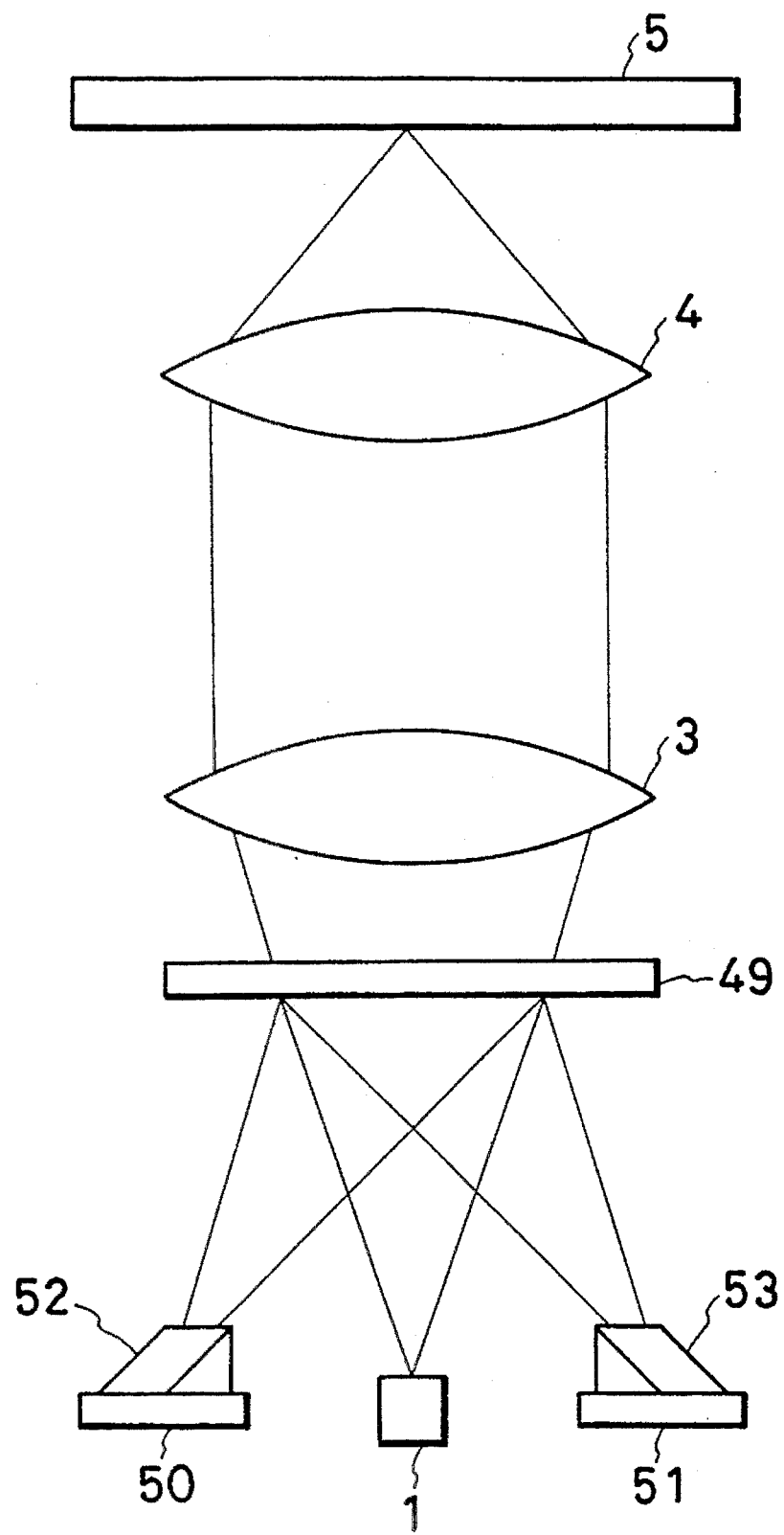
FIG. 7 is a diagram showing an arrangement of a magneto-optical head assembly of a second embodiment according to the invention.

FIG. 7 shows an arrangement of a magneto-optical head assembly of a second embodiment according to the invention. The light emitted from the semiconductor laser 1 is transmitted through the polarizing holographic optical element 49 whose diffraction efficiency is dependent on the polarization direction of the incident light and, after being converted to a parallel beam by the collimator lens 3, is converged on the magneto-optical disk 5 by the objective lens 4. The reflected light from the magneto-optical disk 5 is converted again to a parallel beam by the objective lens 4 and, after being transmitted through the collimator lens 3, is diffracted by the polarizing holographic optical element 49. The +1st order diffracted beams of light from the polarizing holographic optical element 49 are received by the photodetector 50 or 51. On the other hand, the −1st order diffracted beams of light from the polarizing holographic optical element 49 are divided by the polarizing beam splitter 52 or 53 into two polarized light components which are orthogonal to each other and which are detected by the photodetector 50 or 51.

The polarizing holographic optical element 49 has the same construction as the polarizing holographic optical element 2 in the first embodiment, wherein the two layer grating consisting of the proton exchanged region 11 and the dielectric film 22 is formed on a lithium niobate substrate 10 having birefringence. The light emitted from the semiconductor laser 1 is incident on the polarizing holographic optical element 49 as ordinary light and 75% of it is transmitted. On the other hand, since the main polarization component is incident on the polarizing holographic optical element 49 as ordinary light, the reflected light beam from the magneto-optical disk 5 is diffracted by 10.1% as +1st order diffracted light and 10.1% as −1st order diffracted light. Also, since the magneto-optical signal component is incident on the polarizing holographic optical element 49 as extraordinary light, the reflected light beam is diffracted by 40.5% as +1st order diffracted light and 40.5% as −1st order diffracted light.

Figure 8:
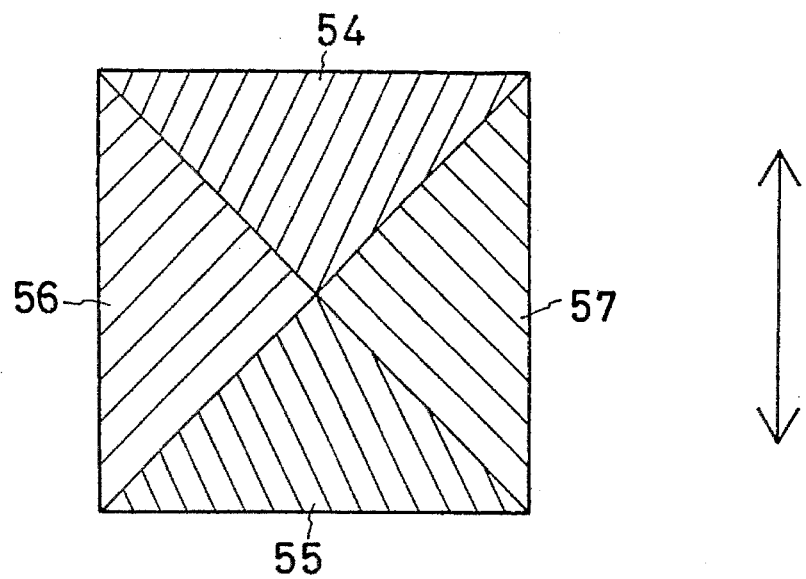
FIG. 8 is a diagram showing an arrangement of the polarizing holographic optical element used in the assembly of the second embodiment according to the invention.

FIG. 8 shows a configuration of the polarizing holographic optical element 49. This element 49 is divided into four regions 54 through 57. The direction of the optic axis of the lithium niobate substrate 10 is shown by arrows in the figure.

Figure 9:
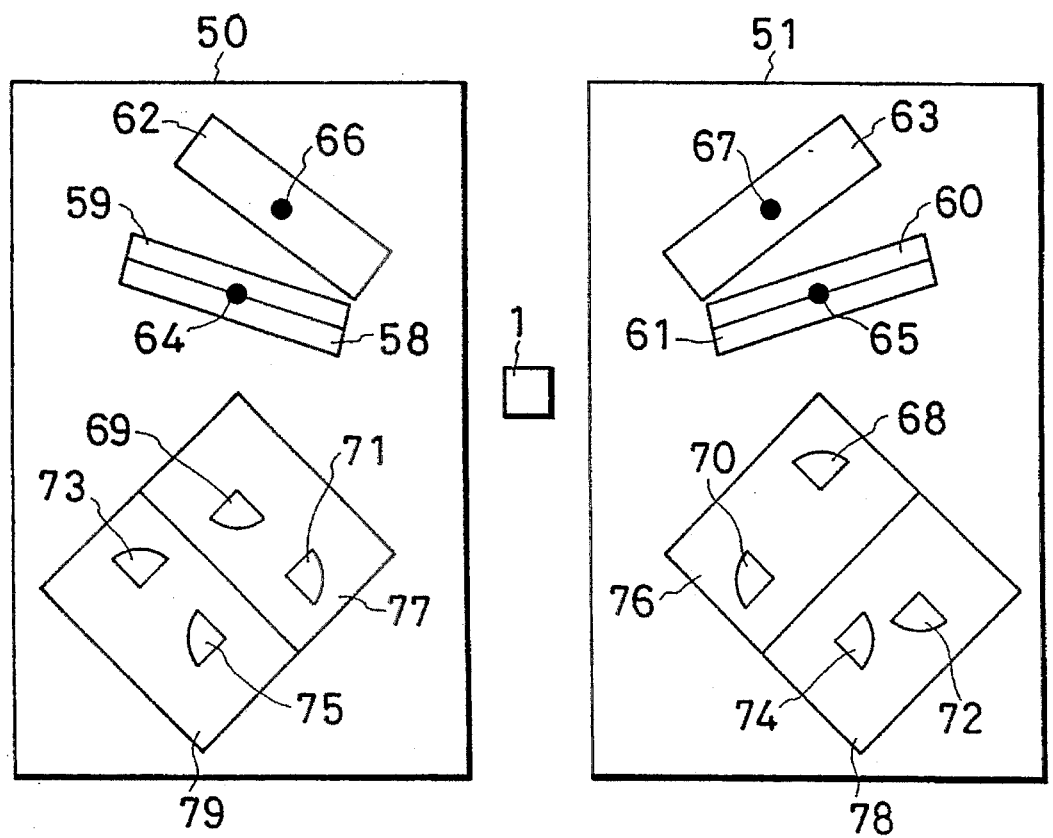
FIG. 9 is a diagram showing an arrangement of photodetectors used in the assembly of the second embodiment according to the invention, and positions of light spots on such photodetectors.

FIG. 9 shows configurations of the photodetectors 50 and 51 and positions of light spots on the photodetectors 50 and 51. The photodetector 50 is divided into five light receiving sections 58, 59, 62, 77 and 79. Also, the photodetector 51 is divided into five light receiving sections 60, 61, 63, 76 and 78.

The +1st order diffracted beams of light from the regions 54 through 57 of the polarizing holographic optical element 49 respectively form light spots 64 through 67 on the photodetectors 50 and 51. The light spot 64 is positioned on the dividing line of the receiving sections 58 and 59, the light spot 65 on the dividing line of the receiving sections 60 and 61, the light spot 66 within the receiving section 62, and the light spot 67 within the receiving section 63. If the outputs from the light receiving sections 58 through 63 are expressed respectively by V(58) through V(63), the focusing error signal may be obtained from {V(58)+V(60)}−{V(59)+V(61)} based on the Foucault theory. Also, the tracking error signal may be obtained from V(62)−V(63) based on the push-pull theory.

Figure 12B:
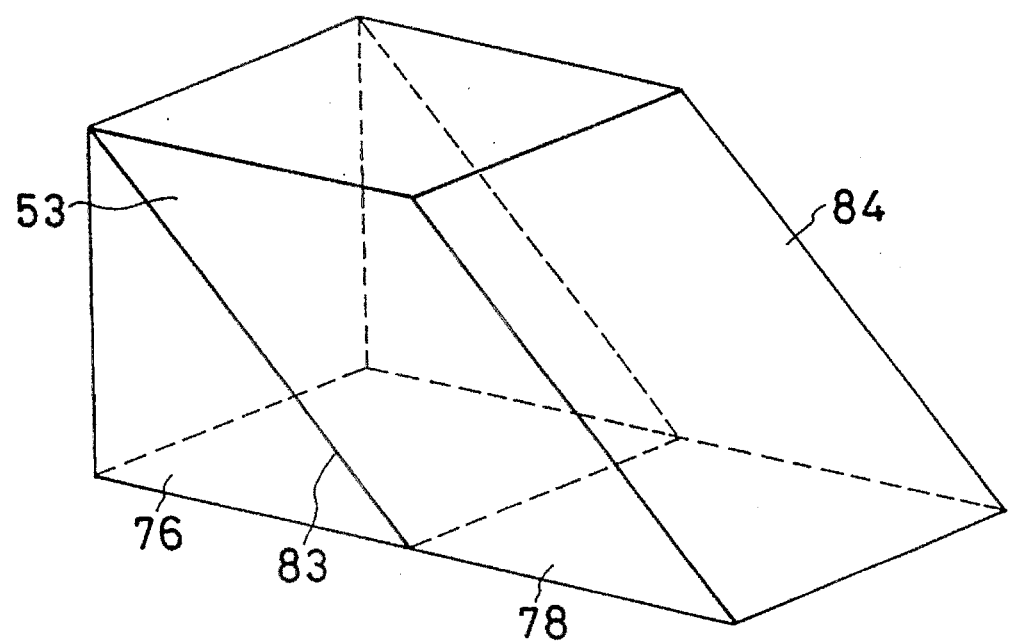

FIG. 12B shows in an enlarged view of the polarizing beam splitter 53, which is the same as the polarizing beam splitter 52. The −1st order diffracted light from the regions 54 and 56 of the polarizing holographic optical element 49 is incident on the polarizing beam splitter 53. The polarizing beam splitter 53 is disposed at a position at which the polarizing beam splitter 9 in the first embodiment is rotated by −45° with respect to the polarization direction of the light emitted from the semiconductor laser 1. The S-polarized light component reflected at a cemented surface 83 of the polarizing beam splitter 53 is reflected at a total internal reflection surface 84 and then is received by the light receiving section 78. The diffracted beams of light from the regions 54 and 56 respectively correspond to the light spots 72 and 74. The P-polarized light component transmitted through the cemented surface 83 of the polarization beam splitter 53 is received at the light receiving section 76. The diffracted beams of light from the regions 54 and 56 respectively correspond to the light spots 68 and 70. In contrast to this, the +1st order diffracted light from the regions 55 and 57 of the polarizing holographic optical element 49 is incident on the polarizing beam splitter 52. The polarizing beam splitter 52 is disposed at a position at which the polarizing beam splitter 9 in the first embodiment is rotated −135° about the polarization direction of the light emitted from the semiconductor laser 1. The S-polarized light component reflected at a cemented surface 83 of the polarizing beam splitter 52 is reflected at a total internal reflection surface 84 and then is received by the receiving section 79. The diffracted beams of light from the regions 55 and 57 respectively correspond to the light spots 73 and 75. The P-polarized light component transmitted through the cemented surface 83 of the polarization beam splitter 52 is received at the light receiving section 77. The diffracted beams of light from the regions 55 and 57 respectively correspond to the light spots 69 and 71. The polarization directions of the light incident on the receiving sections 76 and 79 are coincident with each other and the polarization directions of the light incident on the receiving sections 77 and 78 are also coincident with each other. Thus, if the outputs from the light receiving sections 76 through 79 are expressed respectively by V(76) through V(79), the magneto-optical signals may be obtained from {V(76)+V(79)}−{V(77)+V(78)} based on the differential detection process theory.

Of the magneto-optical signal component of the reflected light from the magneto-optical disk 5, the ratio of the light that reaches the light receiving sections 76 through 79 for the magneto-optical signal detection equals the diffraction efficiency of the 1st order light diffracted by the polarizing holographic optical element 49 with respect to the extraordinary light component, namely, 0.405. This value in the prior art is 0.243 so that, in this embodiment according to the invention, the ratio of the magneto-optical signal component is raised 1.67 times of that in the prior art. Also, the polarization direction of the main polarization component of the reflected light from the magneto-optical disk 5 makes respectively angles of −45° and +45° with respect to the P-polarized light and S-polarized light components split by the polarizing beam splitter 53, hence +45° and −45° with respect to the P-polarized light and S-polarized light components split by the polarizing beam splitter 52. Therefore, in this embodiment according to the invention, the amounts of the two main polarization components which are received by the light receiving sections 76 through 79 of the photodetectors 50 and 51 and used for the magneto-optical signal detection are the same, thereby raising the common-mode noise elimination ratio in the differential detection process.

Figure 10:
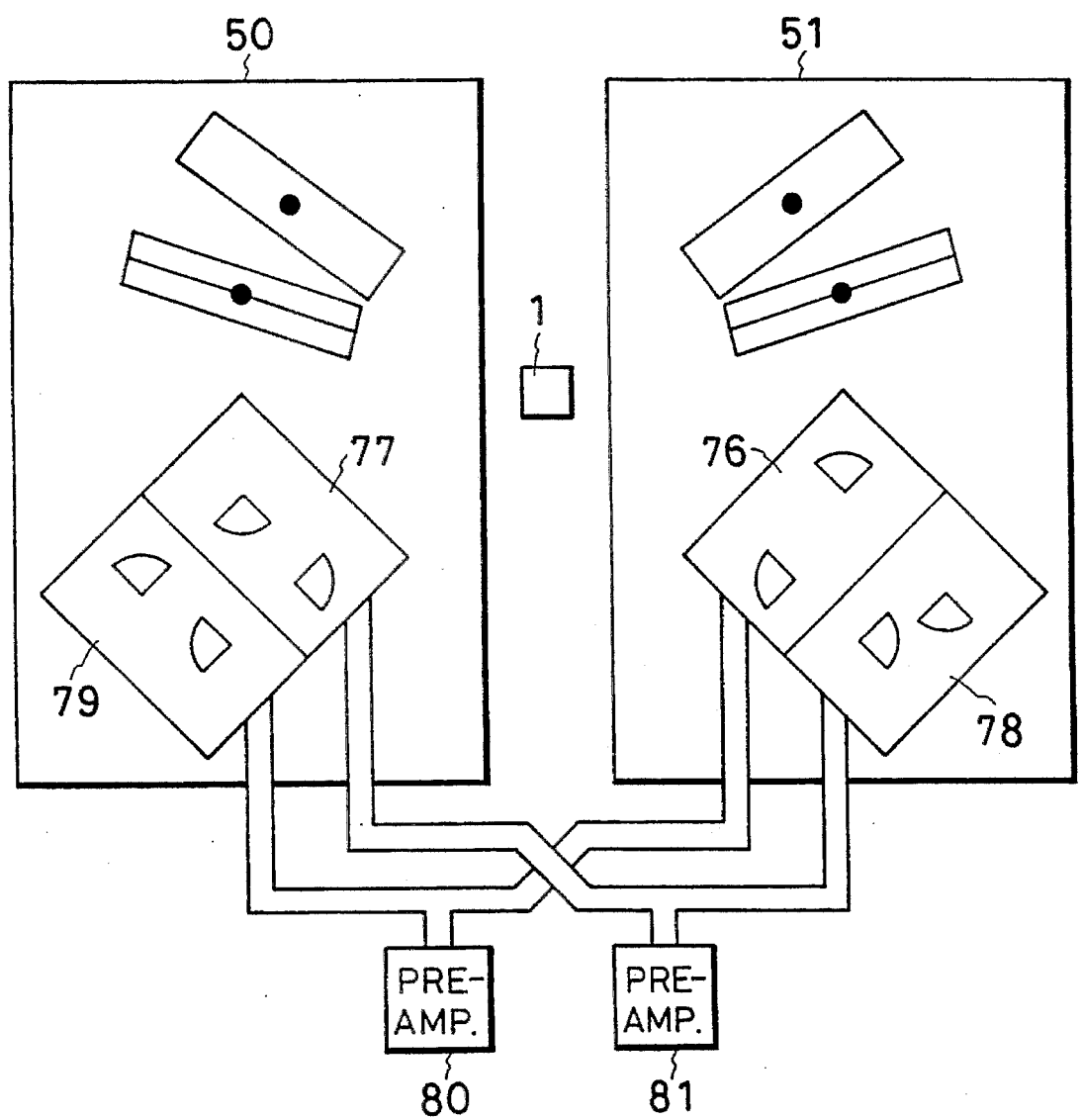
FIG. 10 is a diagram showing connections of preamplifiers used in the assembly of the second embodiment according to the invention.

FIG. 10 shows an arrangement wherein the outputs from the light receiving sections 79 and 76 of the photodetectors 50 and 51 are led to a preamplifier 80 and the outputs from the light receiving sections 77 and 78 are led to a preamplifier 81. By providing the preamplifiers 80 and 81 in proximity to the photodetectors 50 and 51, it is possible to suppress the mixing of noise from the exterior of the interconnecting wiring extending from the photodetectors to the preamplifiers, thereby further raising the signal-to-noise ratio during the reproduction operation. The photodetectors 50 and 51 and the preamplifiers 80 and 81 can be monolithically integrated, in the same silicon substrate.

Figure 11:
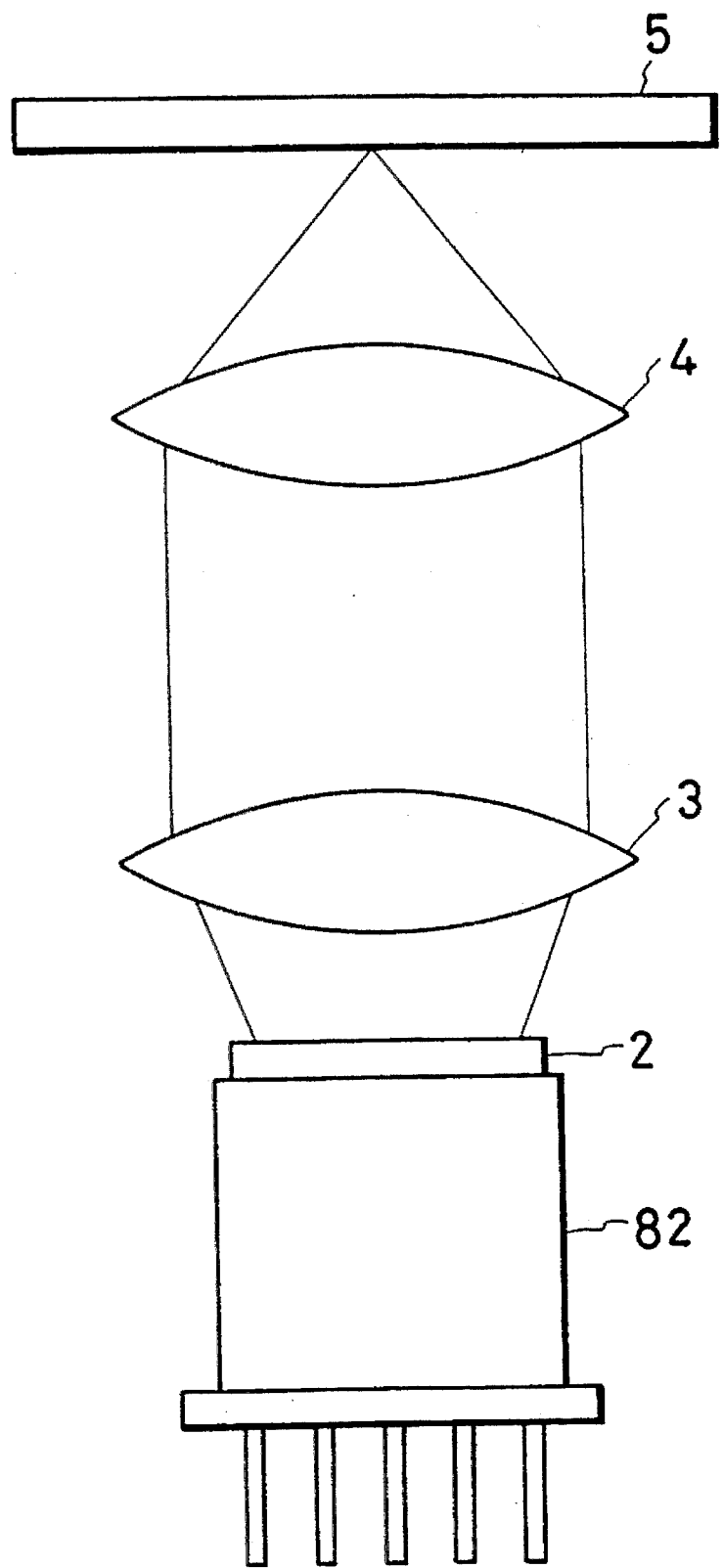
FIG. 11 is a diagram showing an arrangement of a magneto-optical head assembly of a third embodiment according to the invention.

FIG. 11 shows an arrangement of a magneto-optical head assembly of a third embodiment according to the invention. In this embodiment, the semiconductor laser 1, the photodetectors 6 and 7, the half-wave plate 8, and the polarizing beam splitter 9 used in the first embodiment are placed in a package 82 and the polarizing holographic optical element 2 is cemented on a window of the package 82. It is also possible to arrange that the preampifiers 47 and 48 are placed in the package 82. Similarly, it is also possible to arrange that the semiconductor laser 1, the photodetectors 50 and 51 and the polarizing beam splitters 52 and 53 used in the second embodiment are contained in the package 82 with the polarizing holographic optical element 49 being cemented on the package 82. Use of these packaging configurations enables to make the magneto-optical head assembly to be made more compact than the case wherein the semiconductor laser and the photodetectors are individually packaged. Also, since it is possible to suppress any misalignment between the semiconductor laser and the photodetectors due to various factors such as temperature changes, the environmental suitability of the assembly is enhanced.

It is also possible to place between the collimator lens 3 and the objective lens 4 a phase compensation plate which provides a predetermined phase difference between the main polarization component and the magneto-optical signal component of the reflected light from the magneto-optical disk 5. The reflected light from the magneto-optical disk 5, when passing through the lithium niobate substrate 10 of the polarizing holographic optical element 2 or 49, produces a phase difference between the main polarization component and the magneto-optical signal component. This phase difference will be a cause the deterioration of the signal-tonoise ratio during the reproduction operation. Therefore, by using the phase compensation plate which provides a phase difference opposite to that obtained by the lithium niobate substrate 10, it is possible to prevent the deterioration of the signal-to-noise ratio.

Figure 13:
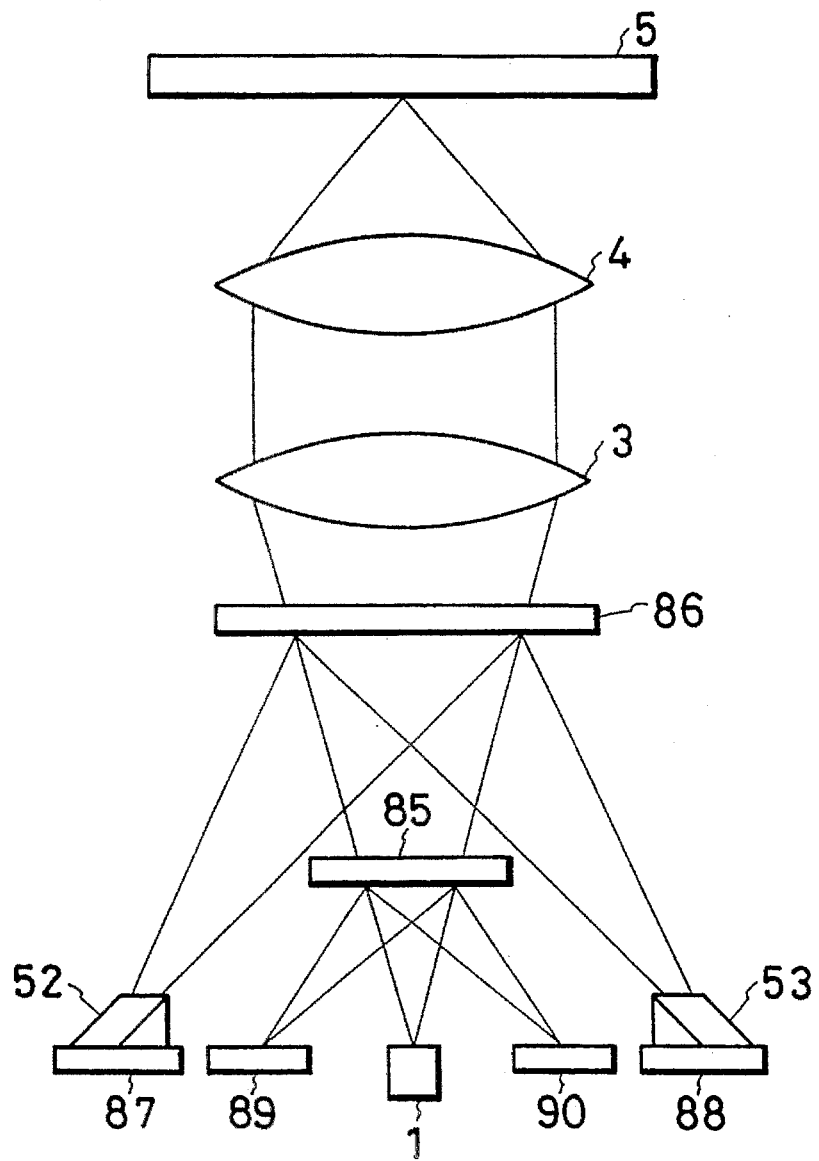
FIG. 13 is a diagram showing an arrangement of a magneto-optical head assembly of a fourth embodiment according to the invention.

FIG. 13 shows an arrangement of a magneto-optical head device of a fourth embodiment according to the invention. The light emitted from the semiconductor laser 1 is transmitted through the non-polarizing holographic optical element 85 whose diffraction efficiency is not dependent on the polarization direction of the incident light and through the polarizing simple grating 86 whose diffraction efficiency is dependent on the polarization direction of the incident light and, after being converted to parallel beams by the collimator lens 3, is converged on the magneto-optical disk 5 by the objective lens 4. The reflected light from the magneto-optical disk 5 is converted again to a parallel beam by the objective lens 4 and, after being transmitted through the collimator lens 3, is partially diffracted by the polarizing simple grating 86 with the remaining being transmitted. The transmitted light from the polarizing simple grating 86 is diffracted by the non-polarizing holographic optical element 85 and received by the photodetectors 89 and 90. On the other hand, the diffracted beams of light from the polarizing simple grating 86 are split by the polarizing beam splitters 52 and 53 into two polarization components which are orthogonal to each other and which are received by the photodetectors 87 and 88.

Figure 14:
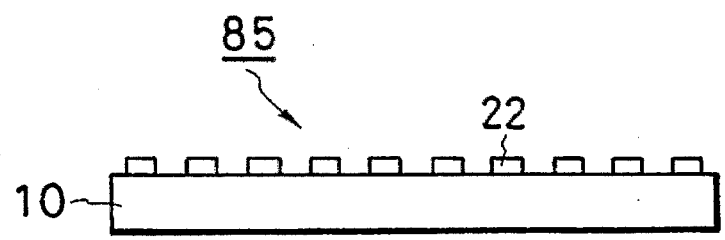
FIG. 14 is a diagrammatic sectional view of a non-polarizing holographic optical element used in the assembly of the fourth embodiment according to the invention.

FIG. 14 shows the non-polarizing holographic optical element 85 in a diagrammatic sectional view. This non-polarizing holographic optical element 85 is comprised of a diffraction grating formed of dielectric film 22 on the lithium niobate substrate 10. The dielectric film 22 may employ, for example, $Nb_2O_5$. It is also possible to use a glass substrate 10 instead of the lithium niobate substrate and $SiO_2$ instead of $Nb_2O_5$. Assuming that the refractive index and the thickness of the dielectric film 22 are respectively n and Td, the phase difference between the line portion and the space portion of the grating is α, and the wavelength of the incident light is λ, the following derives:

$$2\pi/\lambda \times (n-1)Td = \alpha$$

In actuality, n=2.2 (in the case where the dielectric film 22 is $Nb_2O_5$). Thus, where, for example, λ=0.83 μm and Td=0.080 μm, the phase difference will be α=0.23π. Where the widths of the line portion and the space portion of the grating are the same as each other, the transmittivity and the 1st order diffraction efficiency will respectively be:

$$\cos^2(\alpha/2)=0.875$$

$$(2/\pi)^2 \sin^2(\alpha/2)=0.051$$

The polarizing simple grating 86 is, similar to the polarizing holographic optical element 2 in the first embodiment, comprised of a two layer diffraction grating consisting of the proton exchanged region 11 and the dielectric film 22 formed on a lithium niobate substrate 10 having birefringence. The dielectric film 22 may employ, for example, $Nb_2O_5$. Where the refractive index differences between the proton exchanged region 11 and the lithium niobate substrate 10 with respect to the polarization component perpendicular to the optic axis (ordinary light component) and the polarization component parallel to the optic axis (extraordinary light component) are assumed to be respectively $\Delta n_o$ and $\Delta n_e$, the refractive index of the dielectric film 22 to be n, the depth of the proton exchanged region 11 and the thickness of the dielectric film 22 to be respectively Tp and Td, the phase difference between the line portion and the space portion of the grating with respect to the ordinary light component and the extraordinary light component to be respectively $\alpha_o$ and $\alpha_e$, and the wavelength of the incident light to be λ, the following derives:

$$2\pi/\lambda \times \{(n-1)Td + \Delta n_o Tp\} = \alpha_o$$

$$2\pi/\lambda \times \{(n-1)Td + \Delta n_e Tp\} = \alpha_e$$

In actuality, $\Delta n_o = -0.04$, $\Delta n_e = 0.12$ and n=2.2 (where the dielectric film 22 is $Nb_2O_5$). Thus if, for example, λ=0.83 μm, Tp=2.00 μm and Td=0.146 μm, the phase differences will be $\alpha_o = 0.23\pi$ and $\alpha_e = \pi$. If the widths of the line portion and the space portion of the grating are equal to each other, the transmittivities of the ordinary light component and the extraordinary light component will respectively be:

$$\cos^2(\alpha_o/2)=0.875$$

$$\cos^2(\alpha_e/2)=0$$

Also, the 1st order diffraction efficiencies with respect to the ordinary light component and the extraordinary light component will respectively be:

$$(2/\pi)^2 \sin^2(\alpha_o/2)=0.051$$

$$(2/\pi)^2 \sin^2(\alpha_e/2)=0.405$$

It is noted from this that the ordinary light component is partially diffracted and the extraordinary light component is substantially completely diffracted.

Of the light emitted from the semiconductor laser 1, 87.5% is transmitted through the non-polarizing holographic optical element 85. Also, where the optic axis of the lithium niobate substrate 10 used in the polarizing simple grating 86 is set perpendicular to the polarization direction of the light emitted from the semiconductor laser 1, the transmitted light from the non-polarizing holographic optical element 85 is incident on the polarizing simple grating 86 as ordinary light so that also 87.5% is transmitted. On the other hand, since the main polarization component is incident on the polarizing simple grating 86 as ordinary light, and the reflected light beam from the magneto-optical disk 5 is transmitted by 87.5% and diffracted by 5.1% as +1st order diffracted light and 5.1% as −1st order diffracted light. The main polarization component of the light transmitted through the polarizing simple grating 86 is diffracted by 5.1% as +1st order diffracted light and 5.1% as −1st order diffracted light by the non-polarizing holographic optical element 85. Also, because the magneto-optical signal component is incident on the polarizing simple grating 86 as extraordinary light, the reflected light from the magneto-optical disk 5 is diffracted by 40.5% as +1st order diffracted light and 40.5% as −1st order diffracted light.

Figure 15:
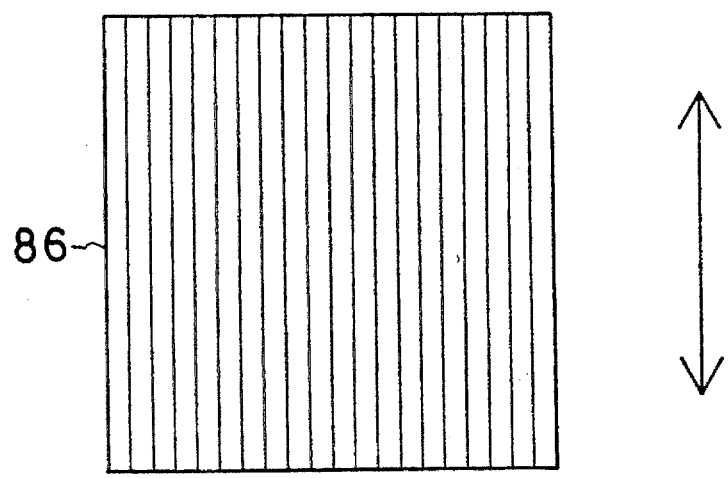
FIG. 15 is a diagram showing an arrangement of the polarizing simple grating used in the assembly of the fourth embodiment according to the invention.

The non-polarizing holographic optical element 85 is, as is the case of the polarizing hollographic optical element 49 in the second embodiment, divided into four regions 54 through 57 having grating orientations different from one another. On the other hand, the polarizing simple grating 86, shown in FIG. 15, is constituted by a single region. The optic axis of the lithium niobate substrate 10 is in the direction shown by arrows in the figure.

Figure 16:
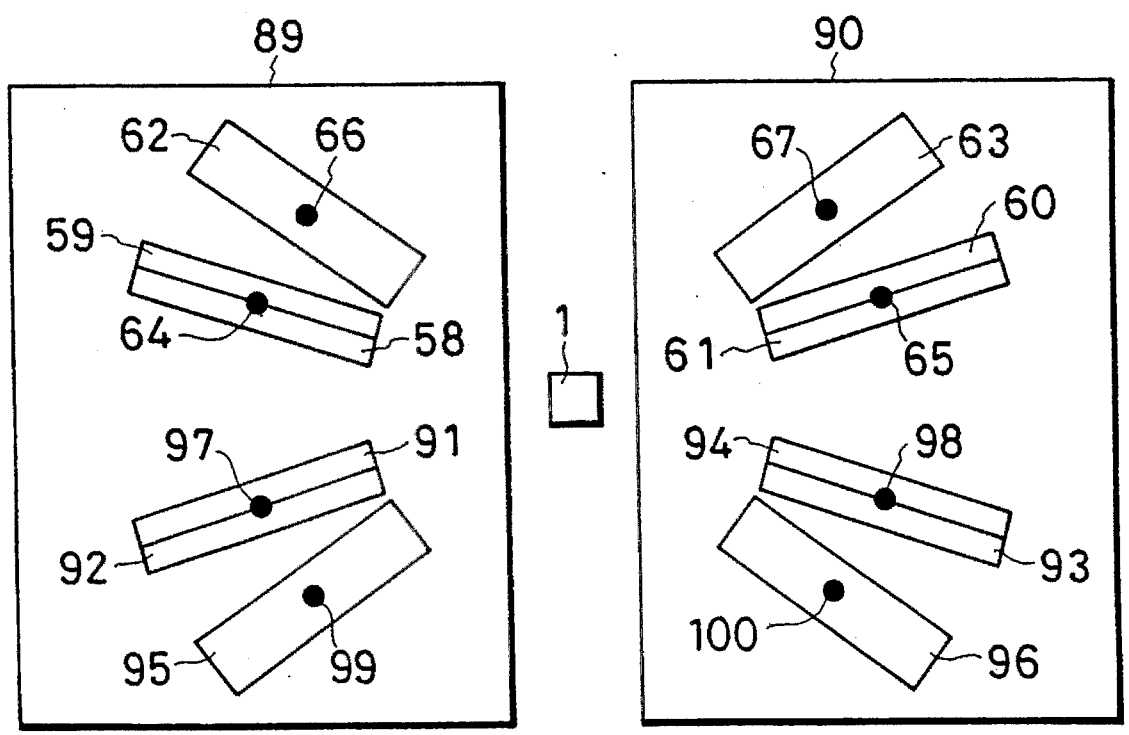
FIG. 16 is a diagram showing an arrangement of photodetectors for detecting error signals, used in the assembly of the fourth embodiment according to the invention, and positions of light spots on such photodetectors.

FIG. 16 shows a configuration of the photodetectors 89 and 90 and positions of light spots on the photodetectors 89 and 90. The photodetector 89 is divided into six light receiving sections 58, 59, 62, 91, 92 and 95. Also, the photodetector 90 is divided into six light receiving sections 60, 61, 63, 93, 94 and 96.

The +1st order diffracted beams of light from the regions 54 through 57 of the non-polarizing holographic optical element 85 respectively form light spots 64 through 67 on the photodetectors 89 and 90. The light spot 64 is positioned on the dividing line of the receiving sections 58 and 59, the light spot 65 on the dividing line of the receiving sections 60 and 61, the light spot 66 within the receiving section 62, and the light spot 67 within the receiving section 63. Also, the −1st order diffracted beams of light from the regions 54 through 57 of the non-polarizing holographic optical element 85 respectively form light spots 97 through 100 on the photodetectors 89 and 90. The light spot 97 is positioned on the dividing line of the receiving sections 91 and 92, the light spot 98 on the dividing line of the receiving sections 93 and 94, the light spot 99 within the receiving section 95, and the light spot 100 within the receiving section 96. If the outputs from the light receiving sections 58 through 63 are expressed respectively by V(58) through V(63) and the outputs from the light receiving sections 91-96 are expressed respectively by V(91) through V(96), the focusing error signals may be obtained from {V(58)+V(60)+V(91)+V(93)}−{V(59)+V(61)+V(92)+V(94)} based on the Foucault theory. Also, the tracking error signals may be obtained from {V(62)+V(96)}−{V(63)+V(95)} based on a push-pull process theory.

Figure 17:
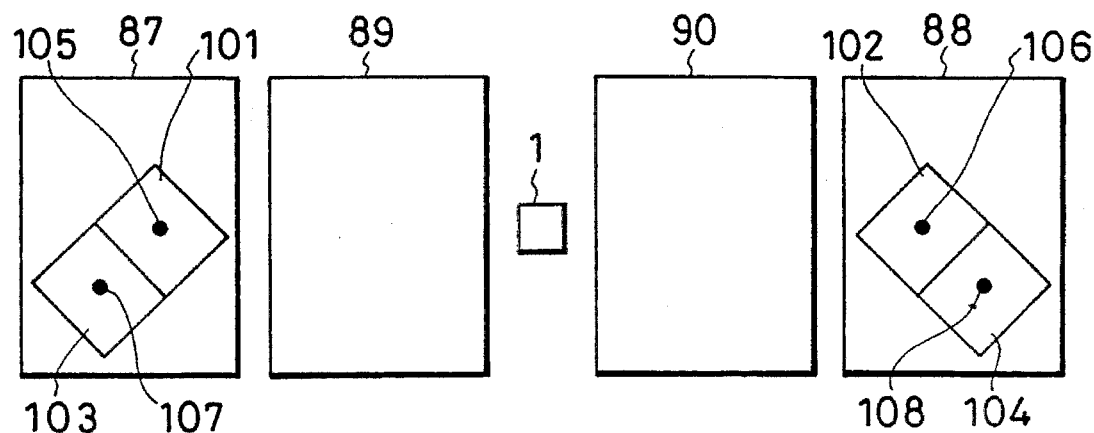
FIG. 17 is a diagram showing an arrangement of photodetectors for detecting magneto-optical signals, used in the assembly of the fourth embodiment according to the invention, and positions of light spots on such photodetectors.

FIG. 17 shows a configuration of the photodetectors 87 and 88 and positions of light spots on the photodetectors 87 and 88. The photodetector 87 is divided into two light receiving sections 101 and 103. Also, the photodetector 39 is divided into two light receiving sections 102 and 104.

The +1st order diffracted light from the polarizing simple grating 86 is incident on the polarizing beam splitter 52. The polarizing beam splitter 52 is disposed at a position at which the polarizing beam splitter 9 in the first embodiment is rotated −135° about the polarization direction of the light emitted from the semiconductor laser 1. The S-polarized light component reflected at a cemented surface 83 of the polarizing beam splitter 52 is reflected at a total internal reflection surface 84 and then forms a light spot 107 on the light receiving section 103. Also, the P-polarized light component of the light transmitted at the cemented surface 83 of the polarization beam splitter 52 forms a light spot 105 on the light receiving section 101. In contrast to this, the −1st order diffracted light from the polarizing simple grating 86 is incident on the polarizing beam splitter 53. The polarizing beam splitter 53 is disposed at a position at which the polarizing beam splitter 9 in the first embodiment is rotated by −45° with respect to the polarization direction of the light emitted from the semiconductor laser 1. The S-polarized light component reflected at a cemented surface 83 of the polarizing beam splitter 53 is reflected at a total internal reflection surface 84 and then forms a light spot 108 on the light receiving section 104. Also, the P-polarized light component transmitted through the cemented surface of the polarizing beam splitter 53 forms a light spot 106 on the light receiving section 102. The polarization directions of the light incident on the light receiving sections 101 and 104 are coincident with each other and the polarization direction of the light incident on the light receiving section 102 and 103 are also coincident with each other. Thus, if the outputs from the light receiving sections 101 through 104 are expressed respectively by V(101) through V(104), the magneto-optical signal may be obtained from {V(101)+V(104)}−{V(102)+V(103)} based on the differential detection process theory.

Of the magneto-optical signal component of the reflected light from the magneto-optical disk 5, the ratio of the light that reaches the light receiving sections 101 through 104 for the magneto-optical signal detection equals the diffraction efficiency of the ±1st order diffracted light with respect to the extraordinary light component of the polarizing simple grating 86, that is, 0.810. This value in the prior art is 0.243. With this value, it is noted that the ratio of the magneto-optical signal component in this embodiment is raised 3.33 times compared with that in the prior art. Also, the polarization direction of the main polarization component of the reflected light from the magneto-optical disk 5 makes respectively angles of +45° and −45° with respect to the P-polarized and S-polarized light components split by the polarizing beam splitter 52, hence −45° and +45° with respect to the P-polarized and S-polarized light components split by the polarizing beam splitter 53. Therefore, in this embodiment according to the invention, the amounts of the two main polarization components which are received by the light receiving sections 101 through 104 of the photodetectors 87 and 88 and used for the magneto-optical signal detection are the same, thereby enabling raising the common-mode noise elimination ratio in the differential detection process.

Figure 18:
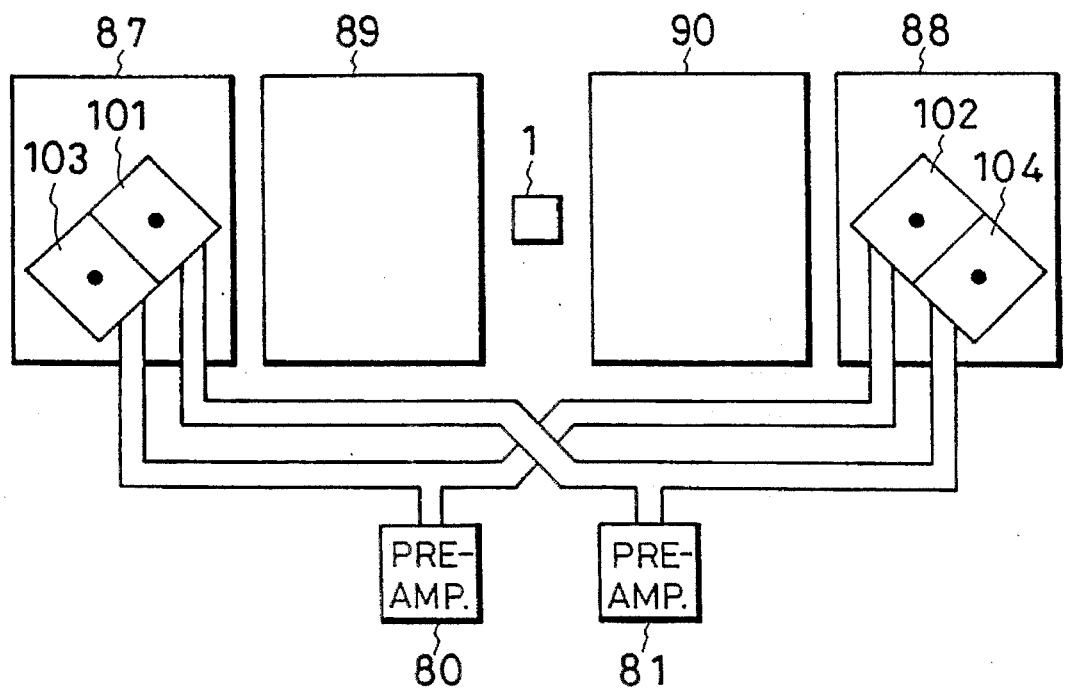
FIG. 18 is a diagram showing connections of preamplifiers used in the assembly of the fourth embodiment according to the invention.

FIG. 18 shows an arrangement wherein the outputs from the light receiving sections 103 and 102 of the photodetectors 87 and 88 are led to a preamplifier 80 and the outputs from the light receiving sections 101 and 104 are led to a preamplifier 81. By providing the preamplifiers 80 and 81 in proximity to the photodetectors 87 and 88, it is possible to suppress the mixing of noise from the exterior of the interconnecting wiring extending from the photodetectors to the preamplifiers, thereby further raising the signal-to-noise ratio during the reproduction operation. The photodetectors 87 and 88 and the preamplifiers 80 and 81 can be monolithically integrated in the same silicon substrate.

Figure 19:
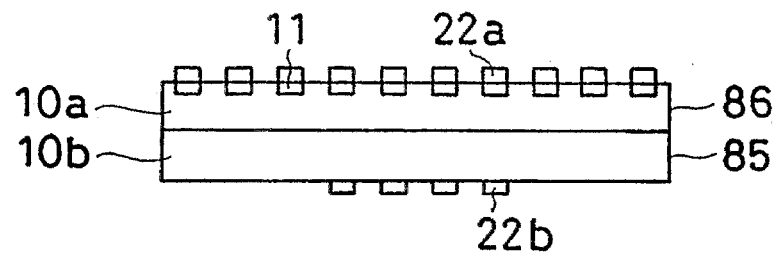
FIG. 19 is a diagram showing an arrangement used in the assembly of the fourth embodiment, in which a non-polarizing holographic optical element and a polarizing simple grating are cemented together.

FIG. 19 shows an arrangement wherein the non-polarizing holographic optical element 85 and the polarizing simple grating 86 are cemented with each other with a surface carrying the grating facing outwardly. In this case, the dielectric film 22b of the non-polarizing holographic optical element 85 is provided only at a center portion of the lithium niobate substrate 10b such that, of the reflected light from the magneto-optical disk 5, the light transmitted through the polarizing simple grating 86 is permitted to enter but the light beams diffracted by the polarizing simple grating 86 are not permitted to enter the dielectric film 22b. The reflected light from the magneto-optical disk 5 produces, when being transmitted through the lithium niobate substrates 10a and 10b, a phase difference between the main polarization component and the magneto-optical signal component. This phase difference becomes a cause for the deterioration of the signal-to-noise ratio during the reproduction operation. However, if the thicknesses of the lithium niobate substrates 10a and 10b are made the same as each other and, moreover, the optic axes thereof are made orthogonal to each other, the phase differences by the lithium niobate substrates 10a and 10b cancel each other thereby preventing the deterioration of the signal-to-noise ratio.

Figure 20:
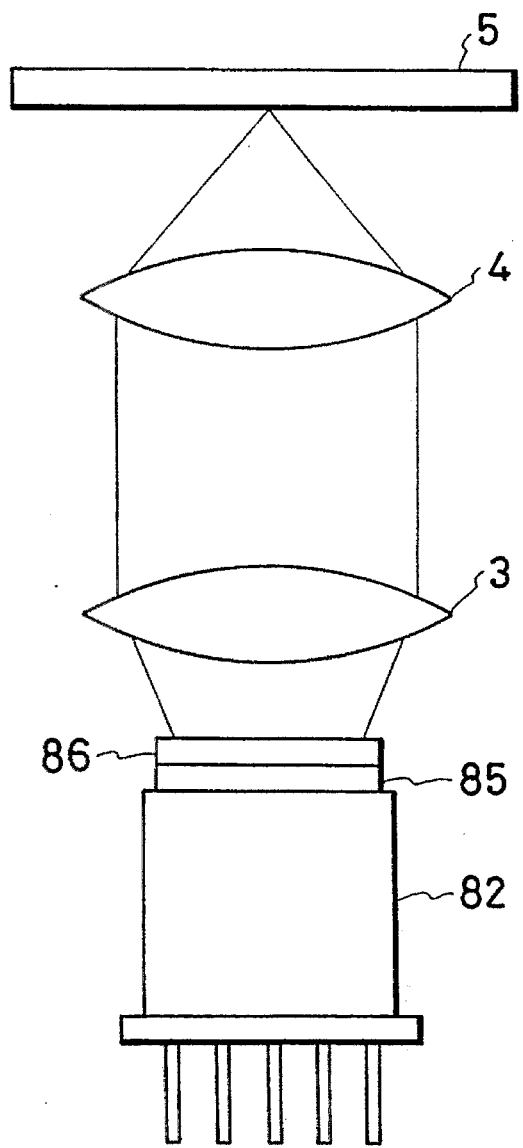
FIG. 20 is a diagram showing an arrangement of a magneto-optical head assembly of a fifth embodiment according to the invention.

FIG. 20 shows an arrangement of a magneto-optical head assembly of a fifth embodiment according to the invention. In this embodiment, the semiconductor laser 1, the photodetectors 87 through 90, and the polarizing beam splitters 52 and 53 are placed in a package 82, and the non-polarizing holographic optical element 85 and the polarizing simple grating 86 are cemented on a window of the package 82. It is also possible for the preamplifiers 80 and 81 to be carried by the package 82. Use of these packaging configurations enables the magneto-optical head assembly to be made more compact than the case wherein the semiconductor laser and the photodetectors are individually packaged. Also, since it is possible to suppress any misalignment between the semiconductor laser and the photodetectors due to various factors such as temperature changes, the environmental suitability of the assembly is enhanced.

Figure 21:
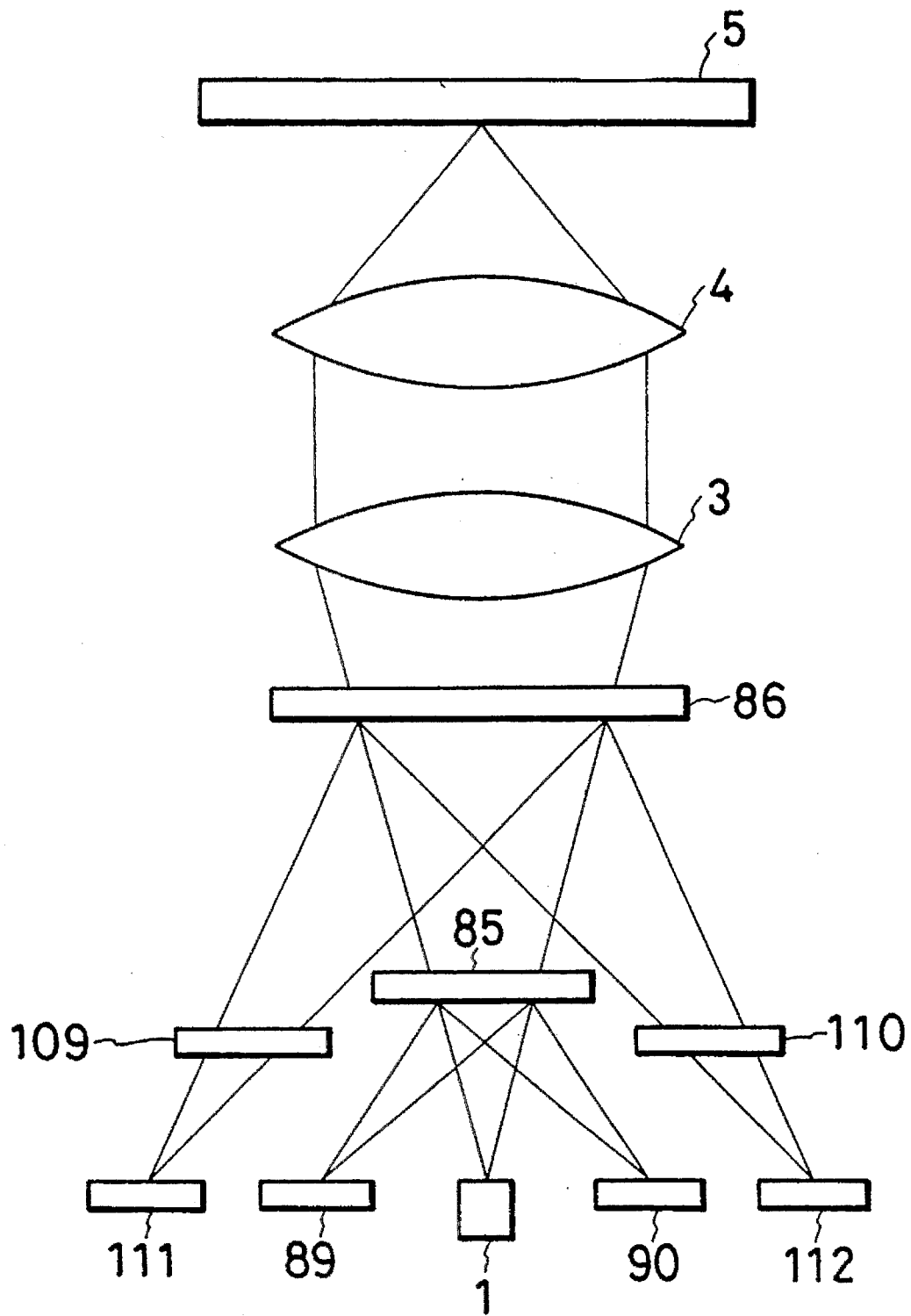
FIG. 21 is a diagram showing an arrangement of a magneto-optical head assembly of a sixth embodiment according to the invention.

FIG. 21 shows an arrangement of a magneto-optical head device of a sixth embodiment according to the invention. The light emitted from the semiconductor laser 1 is transmitted through the non-polarizing holographic optical element 85 whose diffraction efficiency is not dependent on the polarization direction of the incident light and through the polarizing simple grating 86 whose diffraction efficiency is dependent on the polarization direction of the incident light and, after being converted to a parallel beam by the collimator lens 3, is converged on the magneto-optical disk 5 by the objective lens 4. The reflected light from the magneto-optical disk 5 is converted again to parallel beam by the objective lens 4 and, after being transmitted through the collimator lens 3, is partially diffracted by the polarizing simple grating 86 with the remaining being transmitted. The transmitted light from the polarizing simple grating 86 is diffracted by the non-polarizing holographic optical element 85 and received by the photodetectors 89 and 90. On the other hand, the diffracted beams of light from the polarizing simple grating 86 are split by the polarizing simple gratings 109 and 110 into two polarization components which are orthogonal to each other and which are received by the photodetectors 111 and 112.

The arrangement in this sixth embodiment is substantially the same as that in the fourth embodiment except that the polarizing simple gratings 109 and 110 replace the polarizing beam splitters 52 and 53 and the photodetectors 111 and 112 replace the photodetectors 87 and 88. In other respects, both the arrangements are substantially in common so that no description of the details is repeated here.

Each of the polarizing simple gratings 109 and 110 is, similar to the polarizing holographic optical element 2 in the first embodiment, comprised of a two layer diffraction grating consisting of the proton exchanged region 11 and the dielectric film 22 formed on a lithium niobate substrate 10 having birefringence. The dielectric film 22 may employ, for example, $Nb_2O_5$. Where the refractive index differences between the proton exchanged region 11 and the lithium niobate substrate 10 with respect to the polarization component perpendicular to the optic axis (ordinary light component) and the polarization component parallel to the optic axis (extraordinary light component) are assumed to be respectively $\Delta n_o$ and $\Delta n_e$, the refractive index of the dielectric film 22 to be n, the depth of the proton exchanged region 11 and the thickness of the dielectric film 22 to be respectively Tp and Td, the phase difference between the line portion and the space portion of the grating with respect to the ordinary light component and the extraordinary light component to be respectively $\alpha_o$ and $\alpha_e$, and the wavelength of the incident light to be $\lambda$, the following derives:

$$2\pi/\lambda \times \{(n-1)Td + \Delta n_o Tp\} = \alpha_o$$

$$2\pi/\lambda \times \{(n-1)Td + \Delta n_e Tp\} = \alpha_e$$

In actuality, $\Delta n_o = -0.04$, $\Delta n_e = 0.12$ and $n=2.2$ (where the dielectric film 22 is $Nb_2O_5$). Thus if, for example, $\lambda = 0.83$ μm, Tp=2.59 μm and Td=0.086 μm, the phase differences will be $\alpha_o = 0$ and $\alpha_e = \pi$. If the widths of the line portion and the space portion of the grating are equal with each other, the transmittivities of the ordinary light component and the extraordinary light component will respectively be:

$$\cos^2(\alpha_o/2) = 1$$

$$\cos^2(\alpha_e/2) = 0$$

Also, the 1st order diffraction efficiencies with respect to the ordinary light component and the extraordinary light component will respectively be:

$$(2/\pi)^2 \sin^2(\alpha_o/2) = 0$$

$$(2/\pi)^2 \sin^2(\alpha_e/2) = 0.405$$

It is noted from this that the ordinary light component is totally transmitted and the extraordinary light component is substantially completely diffracted.

Figure 22:
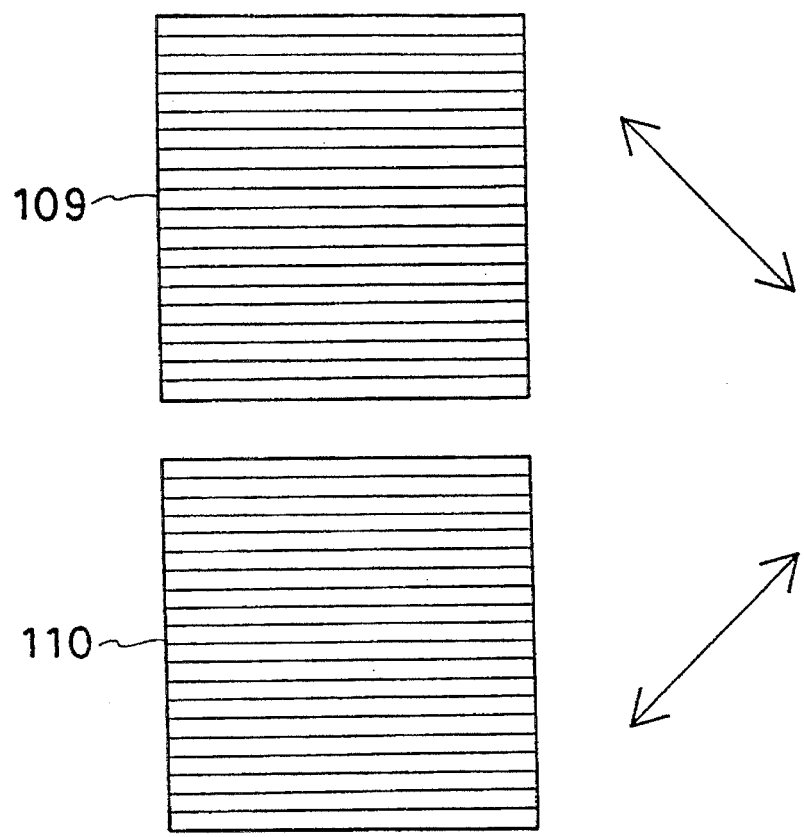
FIG. 22 is a diagram showing an arrangement of the polarizing simple gratings used in the assembly of the sixth embodiment according to the invention.

Each of the polarizing simple gratings 109 and 110 is formed of a single region as seen in FIG. 22. Also, the directions of the optic axes of the lithium niobate substrates used for the polarizing simple gratings 109 and 110 are, as shown by arrows in the figure, with angles of −45° and +45° with respect to the polarization direction of the light emitted from the semiconductor laser 1.

Figure 23:
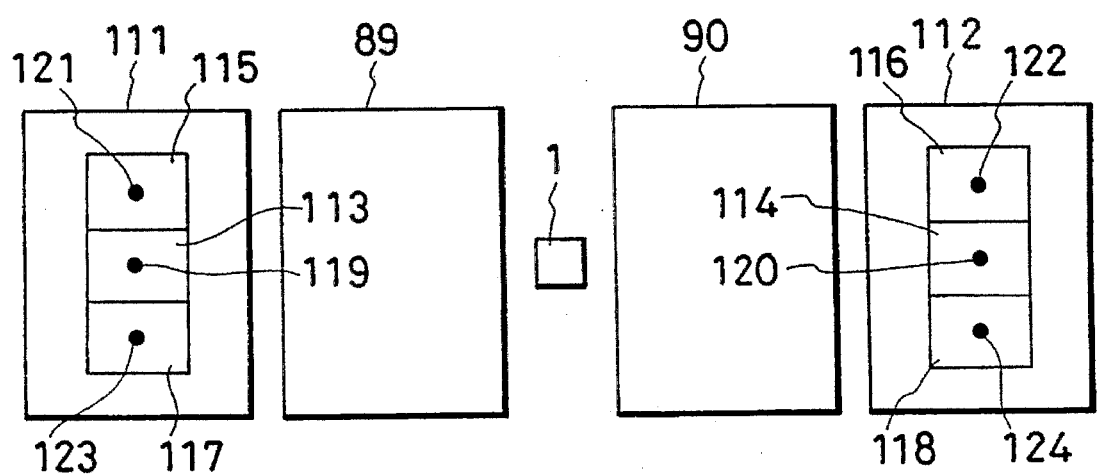
FIG. 23 is a diagram showing an arrangement of photodetectors for detecting magneto-optical signals, used in the assembly of the sixth embodiment according to the invention, and positions of light spots on such photodetectors.

FIG. 23 shows a configuration of the photodetectors 111 and 112 and positions of light spots on the photodetectors 111 and 112. The photodetector 111 is divided into three light receiving sections 113, 115 and 117. Also, the photodetector 112 is divided into three light receiving sections 114, 116 and 118.

The +1st order diffracted light from the polarizing simple grating 86 is incident on the polarizing simple grating 109. The ordinary light component is transmitted by 100% through the polarizing simple grating 109 and forms a light spot 119 on the light receiving section 113. Also, the extraordinary light component is diffracted by 40.5% as +1st order diffracted light and 40.5% as −1st order diffracted light by the polarizing simple grating 109 and forms lights spots 121 and 123 on the light receiving sections 115 and 117. The −1st order diffracted light from the polarizing simple grating 86 is incident on the polarizing simple grating 110. The ordinary light component is transmitted by 100% through the polarizing simple grating 110 and forms a light spot 120 on the light receiving section 114. Also, the extraordinary light component is diffracted by 40.5% as +1st order diffracted light and 40.5% as −1st order diffracted light by the polarizing simple grating 110 and forms light spots 122 and 124 on the light receiving sections 116 and 118. The polarization directions of the beams of light incident on the light receiving sections 113, 116 and 118 are the same as each other and the polarization directions of the beams of light incident on the light receiving sections 114, 115 and 117 are also the same as each other. Thus, if the outputs from the light receiving sections 113 through 118 are expressed respectively by V(113) through V(118), the magneto-optical signal may be obtained from {V(113)+V(116)+(V(118)}−{V(114)+V(115)+V(117)} based on the differential detection process theory.

Of the magneto-optical signal component of the reflected light from the magneto-optical disk 5, the ratio of the light that reaches the light receiving sections 113 through 118 for the magneto-optical signal detection equals the value obtained by having 0.810 multiplied by 0.905, namely, 0.733, where the figure 0.80 is the diffraction efficiency of the ±1st order light diffracted by the polarizing simple grating 86 with respect to the extraordinary light component and the figure 0.905 is a mean value of the transmittivities through the polarizing simple gratings 109 and 110 with respect to the ordinary light component and of the diffraction efficiency of the ±1st order light diffracted by the polarizing simple gratings 109 and 110 with respect to the extraordinary light component. This value in the prior art is 0.243, from which it is noted that the magneto-optical signal component has been raised 3.02 times compared with that in the prior art. Also, the polarization direction of the main polarization component of the reflected light from the magneto-optical disk 5 makes respectively angles of +45° and −45° with respect to the ordinary light component and the extraordinary light component divided by the polarizing simple grating 109, hence −45° and +45° with respect to the ordinary light component and the extraordinary light component divided by the polarizing simple grating 110. Therefore, in this embodiment according to the invention, the amounts of the two main polarization components which are received by the light receiving sections 113 through 118 of the photodetectors 111 and 112 and used for the magneto-optical signal detection are the same, thereby raising the common-mode noise elimination ratio in the differential detection process.

Figure 24:
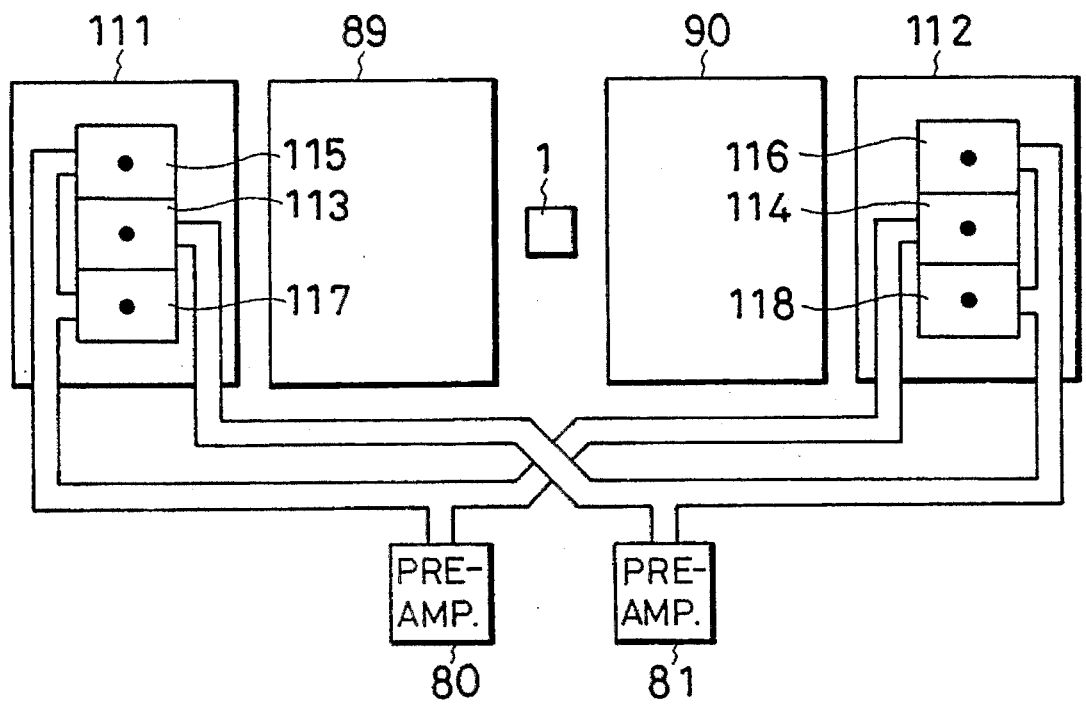
FIG. 24 is a diagram showing connections of preamplifiers used in the assembly of the sixth embodiment according to the invention.

FIG. 24 shows an arrangement wherein the outputs from the light receiving sections 114, 115 and 117 of the photodetectors 112 and 111 are led to a preamplifier 80, and the outputs from the light receiving sections 113, 116 and 118 are led to a preamplifier 81. By providing the preamplifiers 80 and 81 in proximity to the photodetectors 111 and 112, it is possible to suppress the mixing of noise from the exterior of the interconnecting wiring extending from the photodetectors to the preamplifiers, thereby further raising the signal-to-noise ratio during the reproduction operation. The photodetectors 111 and 112 and the preamplifiers 80 and 81 can be monolithically integrated in the same silicon substrate.

Figure 25:
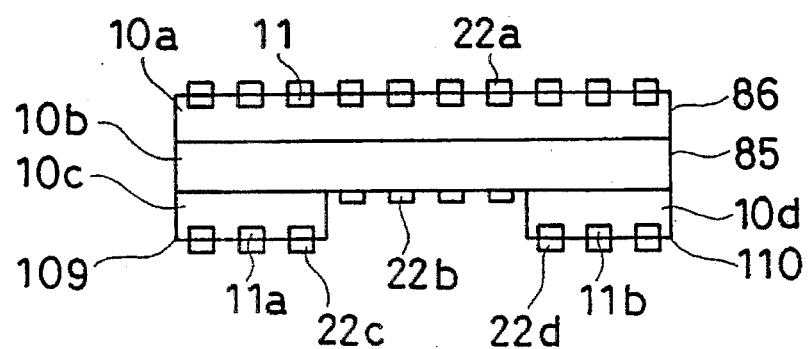
FIG. 25 is a diagram showing an arrangement used in the assembly of the sixth embodiment, in which a non-polarizing holographic optical element and polarizing simple gratings are cemented together.

FIG. 25 shows an arrangement wherein the non-polarizing holographic optical element 85, the polarizing simple grating 86 and the polarizing simple gratings 109 and 110 are cemented together with a surface carrying the grating facing outwardly. In this case, the dielectric film 22b of the non-polarizing holographic optical element 85 is provided only at a center portion of the lithium niobate substrate 10b such that, of the reflected light from the magneto-optical disk 5, the light transmitted through the polarizing simple grating 86 is permitted to enter but the light beams diffracted by the polarizing simple grating 86 are not permitted to enter the dielectric film 22b. Also, the polarizing simple gratings 109 and 110 are provided only at both ends of the lithium niobate substrate 10b such that, of the reflected light from the magneto-optical disk 5, the light beams diffracted by the polarizing simple gratings 86 are permitted to enter but the light transmitted through the polarizing simple grating 86 is not permitted to enter. The reflected light from the magneto-optical disk 5 produces, when being transmitted through the lithium niobate substrates 10a and 10b, a phase difference between the main polarization component and the magneto-optical signal component. This phase difference becomes a cause for deteriorating the signal-to-noise ratio during the reproduction operation. However, if the thicknesses of the lithium niobate substrates 10a and 10b are made the same with each other and, moreover, the optic axes thereof are made orthogonal to each other, the phase differences by the lithium niobate substrates 10a and 10b cancel each other thereby preventing the deterioration of the signal-to-noise ratio. Furthermore, although the reflected light from the magneto-optical disk 5 produces, when being transmitted through the lithium niobate substrates 10c and 10d, a phase difference between the ordinary light component and the extraordinary light component, these two components are completely separated into the transmitted light and the ±1st order diffracted light so that the phase difference does not become a cause for the deterioration of the signal-to-noise ratio.

Figure 26:
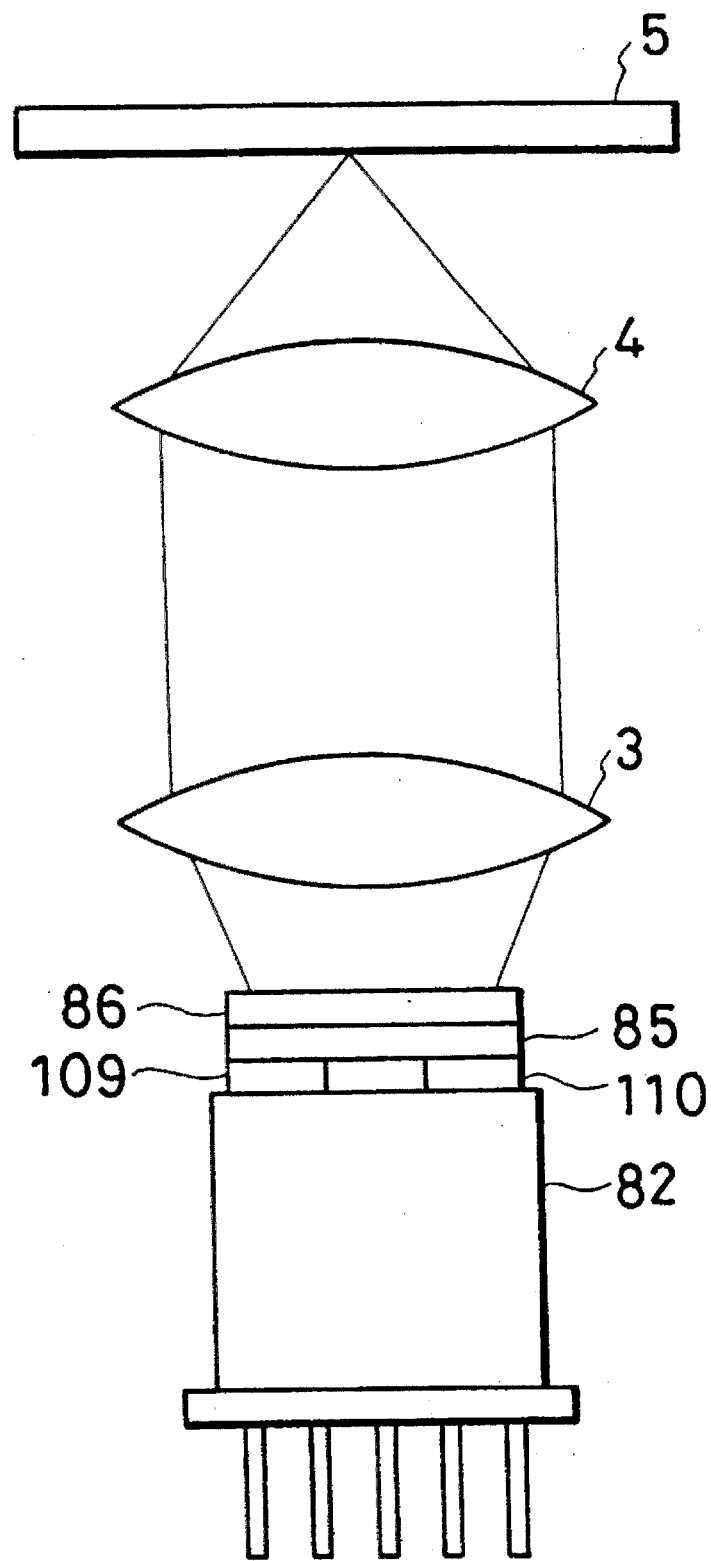
FIG. 26 is a diagram showing an arrangement of a magneto-optical head assembly of a seventh embodiment according to the invention.

FIG. 26 shows an arrangement of a magneto-optical head assembly of a seventh embodiment according to the invention. In this embodiment, the semiconductor laser 1 and the photodetectors 89, 90, 111 and 112 are placed in a package 82, and the non-polarizing holographic optical element 85, the polarizing simple grating 86 and the polarizing simple gratings 109 and 110 are cemented on a window of the package 82. It is also possible for the preamplifiers 80 and 81 to be placed in the package 82. Use of these packaging configurations enables the magneto-optical head assembly to be made more compact than the case wherein the semiconductor laser and the photodetectors are individually packaged. Also, since it is possible to suppress any misalignment between the semiconductor laser and the photodetectors due to various factors such as temperature changes, the environmental suitability of the assembly is enhanced.

In the case of the arrangement wherein the semiconductor laser and the photodetectors are placed in one package, it is not possible to move the photodetectors with respect to the semiconductor laser in order to adjust the offset of the focusing error signal or the tracking error signal. It is therefore desired to make such adjustment by moving the polarizing or non-polarizing holographic optical element with respect to the package. In this respect, it is to be noted that the polarizing holographic optical elements 2 and 49 respectively in the first and the second embodiment of the invention and the non-polarizing holographic optical elements 85 in the fourth and the sixth embodiment of the invention are divided into a plurality of regions which enable the accomplishment of the necessary adjustment. Specifically, in the first embodiment, the offset adjustment of the tracking error signal is performed by parallel movement of the polarizing holographic optical element 2. In the second embodiment, the offset adjustments of the tracking error signal and the focusing error signal are performed respectively by parallel movement and rotational movement of the polarizing holographic optical element 49. In the fourth and sixth embodiments, the offset adjustments of the tracking error signal and the focusing error signal are performed respectively by parallel movement and rotational movement of the non-polarizing holographic optical element 85.

In the arrangements of the third, fifth and seventh embodiments, it is possible to provide between the collimator lens 3 and the objective lens 4 a mirror which bends a light path by 90°. In order to make the magneto-optical head assembly thin, the package 82 may be positioned such that the light is emitted from the semiconductor laser 1 in parallel with respect to the surface of the magneto-optical disk 5 and that this light is bent by the mirror so as to be perpendicularly incident on the surface of the magneto-optical disk 5.

For the operation of accessing to a target track in the magneto-optical disk, there can be a configuration wherein the magneto-optical head assembly as a whole is moved, or an arrangement wherein the magneto-optical head assembly is divided into a fixed part and a moving part and this moving part alone is moved. Where the third embodiment of the invention is employed in the former configuration, the package 82, the polarizing holographic optical element 2, the collimator lens 3 and the objective lens 4 may be housed in a single case whereby the assembly as a whole is moved. It is possible to incorporate a mirror in the case, too. Where the third embodiment of the invention is employed in the latter configuration, the package 82, the polarizing holographic optical element 2 and the collimator lens 3 may be placed in the fixed part, and the objective lens 4 may be placed in the moving part whereby this moving part alone is moved. Here, too, it is possible to incorporate a mirror in the moving part. The same is applicable to the fifth embodiment, wherein the polarizing holographic optical element 2 is replaced by the non-polarizing holographic optical element 85 and the polarizing simple grating 86. The same is also applicable to the seventh embodiment, wherein the polarizing holographic optical element 2 is replaced by non-polarizing holographic optical element 85, the polarizing simple grating 86 and the polarizing simple gratings 109 and 110.

As explained above, in the magneto-optical head assembly according to the invention, it is possible to raise the ratio of the magneto-optical signal component that reaches the photodetectors used for the magneto-optical signal detection. Also, by equalizing the two main polarization components that reach the photodetectors used for the magneto-optical signal detection, it is possible to raise the common-mode noise elimination ratio in the differential detection process. Therefore, the invention can realize a magneto-optical head device which is compact and low cost and in which a good signal-to-noise ratio is obtained during the reproduction operation.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A magneto-optical head device comprising:

a semiconductor laser;

an objective lens system which converges light emitted from said semiconductor laser on a magneto-optical recording medium;

a first diffractive element and a second diffractive element which are sequentially provided between said semiconductor laser and said objective lens system, said first diffractive element having diffraction efficiency not dependent on a polarization direction of incident light and said second diffractive element having diffraction efficiency dependent on the polarization direction of incident light;

a first photodetecting means receiving light which is reflected from said magneto-optical recording medium, transmitted through said second diffractive element, and then diffracted by said first diffractive element;

a second photodetecting means receiving light which is reflected from said magneto-optical recording medium and then diffracted by said second diffractive element; and an analyzing means which is provided between said second diffractive element and said second photodetecting means and which splits the diffracted light from said second diffractive element into two polarized components orthogonal to each other, said second diffractive element having characteristics with which the polarized component in a particular direction in the incident light is partially diffracted and the polarized component orthogonal thereto is substantially totally diffracted and said second diffractive element being disposed such that the polarization direction of the light emitted from said semiconductor laser coincides with said particular direction, and said analyzing means being disposed such that said two polarized components split thereby make an angle of about 45° with respect to the polarization direction of the light emitted from said semiconductor laser.

2. The magneto-optical head device according to claim 1, in which said analyzing means includes a half-wave plate and a polarizing diffractive beam splitter, whereby −1st order diffracted light from said diffractive element is transmitted through said half-wave plate and divided by said polarizing beam splitter into two polarized light components which are orthogonal to each other and which are detected by said photodetecting means.

3. The magneto-optical head device according to claim 1, in which said analyzing means includes polarizing beam splitters whereby each of −1st order diffracted beams of light from said diffractive element are divided by said polarizing beam splitters into two polarized light components which are orthogonal to each other and which are detected by said photodetecting means.

4. The magneto-optical head device according to claim 1, in which said analyzing means includes polarizing beam splitters.

5. The magneto-optical head device according to claim 4, in which said semiconductor laser, said polarizing beam splitters and said photodetecting means are contained in a package and said first diffractive element and said second diffractive element are cemented on said package.

6. The magneto-optical head device according to claim 1, in which said analyzing means includes polarizing simple gratings.

7. The magneto-optical head device according to claim 6, in which said semiconductor laser and said photodetecting means are contained in a package and said first diffractive element, said second diffractive element and said polarizing simple gratings are cemented on said package.

* * * * *